(12) United States Patent
Kasuga et al.

(10) Patent No.: US 9,132,607 B2
(45) Date of Patent: Sep. 15, 2015

(54) FIBER-REINFORCED MOLDED PRODUCT AND METHOD FOR MANUFACTURING THE SAME

(75) Inventors: Yosuke Kasuga, Aichi (JP); Masumi Koide, Aichi (JP); Yoshinori Sugiura, Aichi (JP)

(73) Assignee: INOAC CORPORATION, Aichi (JP)

(*) Notice: Subject to any disclaimer, the term of this patent is extended or adjusted under 35 U.S.C. 154(b) by 172 days.

(21) Appl. No.: 13/813,594

(22) PCT Filed: Aug. 30, 2011

(86) PCT No.: PCT/JP2011/069655
§ 371 (c)(1),
(2), (4) Date: Apr. 11, 2013

(87) PCT Pub. No.: WO2012/029810
PCT Pub. Date: Mar. 8, 2012

(65) Prior Publication Data
US 2013/0189509 A1    Jul. 25, 2013

(30) Foreign Application Priority Data

Aug. 30, 2010  (JP) .................................. 2010-191850
Nov. 4, 2010   (JP) .................................. 2010-247288

(51) Int. Cl.
*B32B 7/04*        (2006.01)
*B29C 43/20*       (2006.01)
(Continued)

(52) U.S. Cl.
CPC ................. *B32B 7/04* (2013.01); *B29C 43/203* (2013.01); *B29C 70/086* (2013.01); *B32B 5/02* (2013.01);
(Continued)

(58) Field of Classification Search
CPC .... B32B 7/04; B32B 5/245; B32B 2260/021; B32B 2260/023; B32B 2260/046; B32B 2266/08; B32B 2266/0278
See application file for complete search history.

(56) References Cited

U.S. PATENT DOCUMENTS 3,171,820 A * 3/1965 Volz ................................ 521/61
3,567,568 A * 3/1971 Windecker .................... 442/224
4,028,477 A   6/1977 Goppel et al.

FOREIGN PATENT DOCUMENTS

JP    1-163020 A    6/1989
JP    03195748 A    8/1991
(Continued)

OTHER PUBLICATIONS

Office Action dated Sep. 30, 2014, issued by the Japanese Intellectual Property Office in counterpart Japanese Application No. 2010-247288.
(Continued)

*Primary Examiner* — Hai Vo
(74) *Attorney, Agent, or Firm* — Sughrue Mion, PLLC

(57) ABSTRACT

A fiber-reinforced molded product 10 includes a core material 11, a fiber reinforcing material 21 laminated on at least one surface of the core material 11, and a surface material 25 laminated on the fiber reinforcing material 21. The core material 11, the fiber reinforcing material 21, and the surface material 25 are integrated. The fiber reinforcing material 21 includes a fiber fabric 21A and a thermosetting resin 11B and 21B impregnated into the fiber fabric 21 and cured. The surface material 25 includes a porous sheet 25A having open cells, the number of the cells being 8 to 80 cells/25 mm, and the thermosetting resin 11B and 21B moved out of the fiber fabric 21 into the porous sheet 25A and cured, and the surface material 25A has a surface roughness Rz of 30 μm or less.

6 Claims, 7 Drawing Sheets

(51) Int. Cl.
*B29C 70/08* (2006.01)
*B32B 5/24* (2006.01)
*B32B 5/02* (2006.01)
*B32B 5/18* (2006.01)
*B29C 43/18* (2006.01)

(52) U.S. Cl.
CPC . *B32B 5/18* (2013.01); *B32B 5/245* (2013.01); *B29C 43/18* (2013.01); *B32B 2250/04* (2013.01); *B32B 2260/00* (2013.01); *B32B 2260/046* (2013.01); *B32B 2262/101* (2013.01); *B32B 2262/106* (2013.01); *B32B 2266/0278* (2013.01); *B32B 2266/0285* (2013.01); *B32B 2266/06* (2013.01); *Y10T 156/10* (2015.01); *Y10T 428/249955* (2015.04); *Y10T 428/249958* (2015.04)

(56) References Cited

FOREIGN PATENT DOCUMENTS

| | | |
|---|---|---|
| JP | 4-4137 A | 1/1992 |
| JP | 04062044 A | 2/1992 |
| JP | 7-40490 A | 2/1995 |
| JP | 7-35451 B2 | 4/1995 |
| JP | 7-23539 U | 5/1995 |
| JP | 8-2606 B2 | 1/1998 |
| JP | 2004-209717 A | 7/2004 |
| JP | 2006-341472 A | 12/2006 |
| JP | 2007-38519 A | 2/2007 |
| WO | 2006/028107 A1 | 3/2006 |

OTHER PUBLICATIONS

Office Action dated Apr. 24, 2014 issued by the State Intellectual Property Office of the People's Republic of China in counterpart Chinese Patent Application No. 201180042090.5.

International Search Report (PCT/ISA/210), dated Dec. 6, 2011, Issued by the International Searching Authority in corresponding International Application No. PCT/JP2011/069655.

Written Opinion (PCT/ISA/237), dated Dec. 6, 2011, Issued by the International Searching Authority in corresponding International Application No. PCT/JP2011/069655.

* cited by examiner (3-1)

(3-2)

(3-3)

(4-1)

(4-2)

(4-3)

(5-1)

(5-2)

(5-3)

(6-1)

(6-2)

(6-3)

(7-1)

(7-2)

(7-3)

(a)

(b)

FIBER-REINFORCED MOLDED PRODUCT AND METHOD FOR MANUFACTURING THE SAME

TECHNICAL FIELD

The present invention relates to a fiber-reinforced molded product, in which a fiber reinforcing material and a surface material are laminated on at least one surface of a core material so that the fiber reinforcing material and the surface material are integrated with the core material, and to a method for manufacturing the same.

BACKGROUND ART

In recent years, fiber-reinforced molded products have been proposed as members requiring high stiffness, such as a housing of laptop computers. As the fiber-reinforced molded products, for example, carbon-fiber-reinforced articles obtained by laminating carbon fiber prepregs and then reacting and curing the laminated carbon fiber prepregs are known. Such fiber-reinforced molded products using carbon-fibers are, for example, known as the following.

Patent Document 1 discloses a fiber reinforced product in which a plurality of fiber reinforcement layers obtained by arranging continuous carbon fibers in a sheet shape in one direction are laminated on top of another in specific arranging directions.

Patent Document 2 discloses a sandwich structure including a core material having pores, and a fiber reinforcing material disposed on both surfaces of the core material and constituted of continuous carbon fibers and a matrix resin.

Patent Document 3 discloses a composite molded article in which continuous fiber reinforcement fabric including at least carbon fibers are disposed on both surface of a soft member layer to produce a sheet, the resulted sheet is set in an injection mold, and then resin parts are injection-molded on a side of the sheet.

Also, Patent Document 4 discloses a method for manufacturing a sandwich type composite material having elasticity, in which fabric sheets formed of glass fibers impregnated with an epoxy resin are arranged on top of another in a mold, and then an urethane resin foam is foamed between the fabric sheets (see Example 1 of Patent Document 4).

However, in fiber-reinforced molded products having fiber fabrics, such as a carbon fiber fabric or a glass fiber fabric, on a surface thereof, stepped portions are created between portions 215, in which fibers are superimposed, and texture gaps 216 on the surface of the molded article, as shown in FIG. 8. As a result, a surface roughness of the surface is increased due to an influence of the stepped portions, and the influences of the stepped portions cannot be reduced even if exterior coating is performed. Thus, it is difficult to obtain a smooth surface. A reference numeral 221 designates transverse fibers and a reference numeral 222 designates longitudinal fibers.

Also, when exterior coating has been performed, air bubbles are remained in the stepped portions, so that pinholes can be created on the surface of the coating film. In particular, an appearance state after exterior coating is important for a use in which exterior coating is usually performed from the viewpoint of improving aesthetic appearance and the like. In general, inorganic materials, such as carbon fibers, do not have a good compatibility (adhesion) with urethane coatings or UV coatings, and thus there is also a possibility that coating film may be peeled off.

PRIOR ART DOCUMENTS

Patent Document

Patent Document 1: JP 2004-209717 A
Patent Document 2: WO2006/028107
Patent Document 3: JP 2007-038519 A
Patent Document 4: JP 01-163020 A

SUMMARY OF INVENTION

Problem to be Solved by Invention

Accordingly, the present invention has been made keeping in mind the above problems, and an object of the present invention is to provide a fiber-reinforced molded product which has a low surface roughness of a surface before coating and a good external appearance after coating, thereby eliminating a possibility that a coating film may be peeled off, and a method for manufacturing the same.

Means for Solving the Problem

To solve the object, according to the present invention, there is provided a fiber-reinforced molded product including: a core material; a fiber reinforcing material laminated on at least one surface of the core material; and a surface material laminated on the fiber reinforcing material. The core material, the fiber reinforcing material and the surface material are integrated. The fiber reinforcing material includes a fiber fabric and a thermosetting resin impregnated into the fiber fabric and cured. The surface material includes a porous sheet having open cells, the number of cells being 8 to 80 cells/25 mm, and a thermosetting resin impregnated into the porous sheet and cured. The surface material has a surface roughness Rz of 30 µm or less.

In the fiber-reinforced molded product described above, the porous sheet may be made of a resin foam.

In the fiber-reinforced molded product described above, the resin foam may be an urethane resin foam.

In the fiber-reinforced molded product described above, the resin foam may be an urethane resin foam from which cell membranes are removed.

In the fiber-reinforced molded product described above, the core material may include a core material member having open cells, and a core material thermosetting resin impregnated into the core material member and cured; and the core material, the fiber reinforcing material, and the surface material may be integrated by the thermosetting resin and the core material thermosetting resin.

In the fiber-reinforced molded product described above, the core material thermosetting resin may be the same as the thermosetting resin.

In the fiber-reinforced molded product described above, the fiber reinforcing material may be laminated on both surfaces of the core material respectively, and the surface material may be laminated on at least one surface of the fiber reinforcing material.

In the fiber-reinforced molded product described above, the core material may include a plurality of core material members.

In the fiber-reinforced molded product described above, a surface of the surface material may be provided with a coating film, and the coating film may have a surface roughness of 25 µm or less.

Further, according to the present invention, there is provided a method for manufacturing a fiber-reinforced molded product. The fiber-reinforced molded product includes: a core material including a core material member; a fiber reinforcing material including a fiber fabric and laminated on at least one surface of the core material; and a surface material including a porous sheet and laminated on the fiber reinforcing material. The method including the steps of: impregnating at least one of the core material member and the fiber fabric with a thermosetting resin; laminating the fiber fabric and the porous sheet in this order on at least one surface of the core material member, the porous sheet having open cells, the number of cells being 8 to 80 cells/25 mm, and a thickness of 0.4 to 3.0 mm; and compressing and heating the core material member, the fiber fabric and the porous sheet, thereby impregnating the core material member, the fiber fabric and the porous sheet with the thermosetting resin, curing the thermosetting resin, and integrating the core material member, the fiber fabric and the porous sheet.

In the method for manufacturing a fiber-reinforced molded product described above, the fiber reinforcing material may be laminated on both surfaces of the core material respectively. The impregnating step may include impregnating the core material member with the thermosetting resin such that a resin ratio R, defined by Equation (B1) below, is 50 to 80%. The laminating step may include laminating at least the fiber fabric on the other surface of the core material member. The compressing and heating step may include curing the thermosetting resin in a state in which the core material member is compressed such that a compression rate C, defined by Equation (A1) below, is 200 to 5000%. The fiber-reinforced molded product may have a flexural modulus of 30 GPa or more.

$$C=(Tb-Ta)/Ta \times 100 \quad (A1)$$

(Ta: a thickness of the core material member after compression, Tb: a thickness of the core material member before compression, C: a compression rate)

$$R=(Wb-Wa)/Wb \times 100 \quad (B1)$$

(Wa: a total weight of the core material member, the fiber fabric and the porous sheet, Wb: a total weight of the core material member, the fiber fabric and the porous sheet after impregnation of the thermosetting resin, and R: a resin ratio)

In the method for manufacturing a fiber-reinforced molded product described above, the compression rate of the core material member may be 1000 to 2600%.

In the method for manufacturing a fiber-reinforced molded product described above, the porous sheet may be made of an urethane resin foam from which cell membranes are removed.

In the method for manufacturing a fiber-reinforced molded product described above, the impregnating step may include impregnating both of the core material member and the fiber fabric with the thermosetting resin made of same material.

In the method for manufacturing a fiber-reinforced molded product described above, the laminating step may include: producing a prepreg having the fiber fabric impregnated with the thermosetting resin and the porous sheet laminated on the fiber fabric; and laminating the prepreg on the core material member such that the fiber fabric contacts the core material member.

In the method for manufacturing a fiber-reinforced molded product described above, the laminating step may include: producing two sheets of prepregs, each having the fiber fabric impregnated with the thermosetting resin and the porous sheet laminated on the fiber fabric; and laminating the prepregs on both surfaces of the core material member respectively such that the fiber fabric of one of the prepregs contacts the core material member and such that the porous sheet of the other prepreg contacts the core material member.

Further, according to the present invention, there is provided a fiber-reinforced molded product including: a core material including a core material member having open cells; a fiber reinforcing material including a fiber fabric and laminated on both surfaces of the core material; and a surface material including a porous sheet and laminated on at least one surface of the fiber reinforcing material. The core material, the fiber reinforcing material and the surface material are integrated by a thermosetting resin. The core material is formed by impregnating the core material member with the thermosetting resin and by curing the thermosetting resin in a state that the core material member is compressed, and has a compression rate C, defined by Equation (A1) below, of 200 to 5000%. The thermosetting resin has a resin ratio R, defined by Equation (B1) below, of 50 to 80%. The fiber-reinforced molded product has a flexural modulus of 30 GPa or more.

$$C=(Tb-Ta)/Ta \times 100 \quad (A1)$$

(Ta: a thickness of the core material member after compression, Tb: a thickness of the core material member before compression, C: a compression rate)

$$R=(Wb-Wa)/Wb \times 100 \quad (B1)$$

(Wa: a total weight of the core material member, the fiber fabric and the porous sheet, Wb: a total weight of the core material member, the fiber fabric and the porous sheet after impregnation of the thermosetting resin, and R: a resin ratio)

Further, according to the present invention, there is provided a method for manufacturing a fiber-reinforced molded product. The fiber-reinforced molded product includes: a core material including a core material member; a fiber reinforcing material including a fiber fabric and laminated on both surfaces of the core material; and a surface material including a porous sheet having open cells and laminated on at least one surface of the fiber reinforcing material. The method includes the steps of: impregnating at least one of the core material member and the fiber fabric with a thermosetting resin; laminating the fiber fabric on each surfaces of the core material member and laminating the porous sheet on at least one surface of the laminated fiber fabric; and compressing and heating the core material member, the fiber fabrics and the porous sheet, thereby impregnating the core material member, the fiber fabrics and the porous sheet with the thermosetting resin, curing the thermosetting resin, and integrating the core material member, the fiber fabrics and the porous sheet. The impregnation in the impregnating step is performed such that a resin ratio R, defined by Equation (B1) below, is 50 to 80%. The compression in the compressing and heating step is performed such that a compression rate C, defined by Equation (A1) below, is 200 to 5000%.

$$C=(Tb-Ta)/Ta \times 100 \quad (A1)$$

(Ta: a thickness of the core material member after compression, Tb: a thickness of the core material member before compression, C: a compression rate)

$$R=(Wb-Wa)/Wb \times 100 \quad (B1)$$

(Wa: a total weight of the core material member, the fiber fabric and the porous sheet, Wb: a total weight of the core material member, the fiber fabric and the porous sheet after impregnation of the thermosetting resin, and R: a resin ratio)

Advantages of Invention

According to the fiber-reinforced molded product of the present invention, the surface material is formed by impregnating a thermosetting resin into a porous sheet having open cells, the number of the cells being 8 to 80 cells/25 mm, by capillary action and then curing the thermosetting resin. Accordingly, the thermosetting resin can easily ooze out to the surface through open cells, and thus the thermosetting resin oozed out to the surface of the surface material can form a smooth surface. As a result, the surface roughness of the surface material can become 30 μm or less, thereby achieving a fiber-reinforced molded product having a reduced surface roughness and a good appearance.

Also, because the most of the smooth surface is formed of the thermosetting resin oozed out of the porous sheet, the surface is integrated with the fiber-reinforced molded product, thereby preventing the surface from being peeled off together with a coating film. In addition, the fiber-reinforced molded product of the present invention has a good coating film adhesion, because the thermosetting resin has a high adhesion to the coating film.

According to the method for manufacturing a fiber-reinforced molded product of the present invention, a fiber-reinforced molded product having an excellent appearance as described above can be easily obtained.

In addition, according to the fiber-reinforced molded product of the present invention, a resin ratio R is set to 50 to 80% and a compression rate C are set to 200 to 5000%. Thus, the core material can be densely filled with the thermosetting resin without gaps, so that a fiber-reinforced molded product having a sufficiently high stiffness can be obtained. Also, because the surface material includes the porous sheet having open cells, the thermosetting resin oozed out of the porous sheet by capillary action can be cured on the surface of the porous sheet, thereby obtaining a fiber-reinforced molded product having a smooth surface with an excellent appearance.

Also, according to the method for manufacturing a fiber-reinforced molded product of the present invention, a fiber-reinforced molded product having a high stiffness and an excellent appearance as described above can be easily obtained.

EMBODIMENTS OF INVENTION

A fiber-reinforced molded product according to an embodiment of the present invention will be now described in detail with reference to the accompanying drawings.

Figure 1:
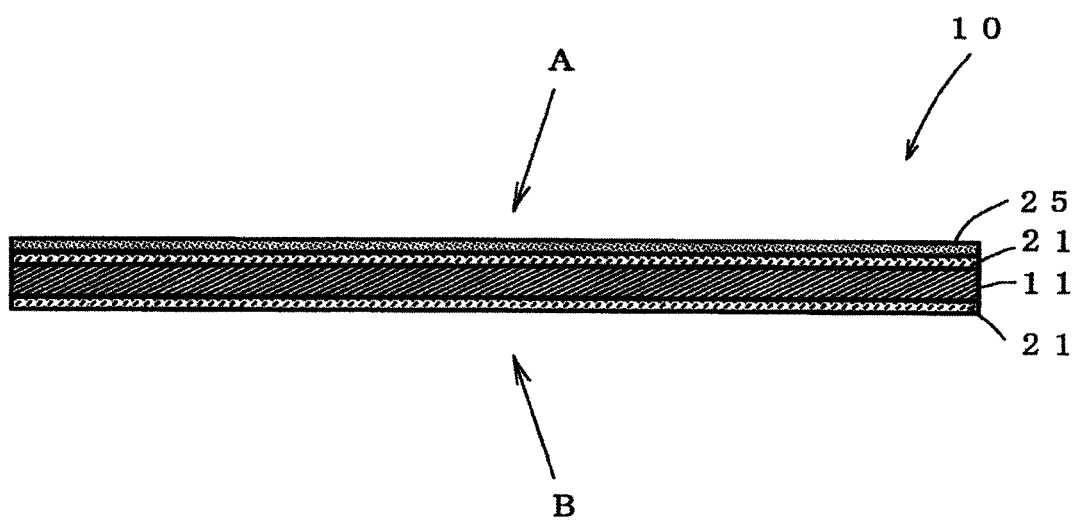
FIG. 1 is a cross sectional view showing a fiber-reinforced molded product according to an embodiment 1 of the present invention.

A fiber-reinforced molded product 10 according to an embodiment of the present invention shown in FIG. 1 includes a core material 11, fiber reinforcing materials 21 integrally laminated on both surfaces of the core material 11, and a surface material 25 integrally laminated on a surface of the fiber reinforcing material 21 at one side of the core material 11, and can be used for a housing of portable devices, such as laptop computers, after a surface of the surface material 25 is coated.

In an example shown, on a side A of the fiber-reinforced molded product 10 on which coating is to be performed, the fiber reinforcing material 21 and the surface material 25 laminated on the core material 11, and, on a side B on which coating does not to be performed, only the fiber reinforcing material 21 is laminated but the surface material 25 is not laminated. However, depending on a use of the fiber-reinforced molded product 10 and the like, both of the fiber reinforcing material 21 and the surface material 25 may not be laminated on the side B on which coating is not formed. Also, in a case of a use in which coating is performed on both sides of the fiber-reinforced molded product 10, the surface materials 25 may be preferably laminated on surfaces of the fiber reinforcing materials 21 on both sides of the core material 11.

The fiber-reinforced molded product 10 is a plate-shaped member having a predetermined size. The fiber-reinforced molded product 10 has a thickness of 0.3 to 2.0 mm and a flexural modulus (JIS K 7074-1988 Method A) of 30 GPa or more and 60 GPa or less, preferably 35 GPa or more and 55 GPa or less. A specific gravity of the fiber-reinforced molded product 10 is 1.2 or more and 1.5 or less, preferably, 1.28 or more and 1.35 or less.

If the thickness of the fiber-reinforced molded product 10 is smaller than 0.3 mm, stiffness cannot be obtained, and if the thickness is thicker than 2.0 mm, the entire portable devices become thick. When the fiber-reinforced molded product 10 is used as a housing of portable devices, a side wall and the like of the housing are disposed upright at predetermined surface positions, by so-called outsert molding, such as injection molding.

The core material 11 has a sheet-shaped core material member and is preferably formed by impregnating a core material resin foam having open cells with a thermosetting resin (a core material thermosetting resin) and by curing the thermosetting resin. A material for the core material member is not particularly limited and can be selected from thermosetting resin foams, such as an urethane resin foam or a melamine resin foam. When flame retardant is required for the fiber-reinforced molded product 10, the core material member preferably has flame retardant. In this regard, the melamine resin foam is suitable as the core material member, because the melamine resin foam has a good flame retardant.

The core material 11 more preferably has the core material thermosetting resin cured with the core material member compressed. By curing the core material thermosetting resin with the core material member compressed, a reduced thickness and an enhanced stiffness of the fiber-reinforced molded product 10 can be achieved. Meanwhile, a compression degree is preferably set such that the fiber-reinforced molded product can obtain a thickness of 0.3 mm to 2.0 mm when manufacturing the fiber-reinforced molded product as described below.

An uncompressed thickness of the core material member can be varied depending on a compression rate, but is preferably in a range of 1 mm to 25 mm when attempting to obtain a fiber-reinforced molded product having a thickness of, for example, 2 mm or less. When the uncompressed thickness is within such a range, a moderate amount of the core material thermosetting resin can be impregnated and a yield after heating and compression can also be enhanced.

When the uncompressed thickness is smaller than 1 mm, the impregnated core material thermosetting resin is not held in the core material member, as a result of which non-uniformity in resin ratio is arisen, thereby decreasing the flexural modulus (stiffness). If the uncompressed thickness is larger than 25 mm, it is difficult to compress the core material member when attempting to obtain a fiber-reinforced molded product having a thickness of 2 mm or less, and thus the fiber-reinforced molded product having a uniform thickness cannot be obtained. Also, from the viewpoint of ease of compression, impregnating ability, lightness and stiffness, the core material member preferably has a density of 5 kg/m$^3$ to 80 kg/m$^3$ before compression thereof.

A material for the core material thermosetting resin is not particularly limited, but to increase stiffness of the fiber-reinforced molded product 10, the core material thermosetting resin itself needs to have a certain degree of stiffness. In this regard, the core material thermosetting resin may be selected from a group consisting of an epoxy resin, a phenolic resin, and a mixture of an epoxy resin and a phenolic resin. When flame retardant is required for the fiber-reinforced molded product 10, the core material thermosetting resin preferably has flame retardant. Phenolic resin is suitable as the core material thermosetting resin because phenolic resin has a good flame retardant.

The fiber reinforcing material 21 is formed by impregnating a fiber fabric with a thermosetting resin (a reinforcing material thermosetting resin) and curing the thermosetting resin. Examples of the fiber fabric include fabrics formed by glass fibers, carbon fibers and the like, but a carbon fiber fabric is particularly preferable as the fiber fabric in terms of lightness and high stiffness. Also, the fiber fabric may preferably be a fabric whose fibers are not aligned only in one direction but be woven. For example, a plain woven fabric, a twill woven fabric, and a sateen woven fabric which are formed from warp threads and weft threads, and a triaxial woven fabric formed from three-way threads are suitable. Also, when the carbon fiber fabric is used as the fiber fabric, a fiber weight of the carbon fiber fabric is preferably 90 g/m$^2$ to 400 g/m$^2$ from the viewpoint of impregnation and stiffness of the thermosetting resin.

The thermosetting resin for the reinforcing material is not particularly limited, but to increase stiffness of the fiber-reinforced molded product 10, the reinforcing material thermosetting resin itself needs to have a certain degree of stiffness. In this regard, the reinforcing material thermosetting resin may be selected from a group consisting of an epoxy resin, a phenolic resin, and a mixture of an epoxy resin and a phenolic resin. Also, when flame retardant is required for the fiber-reinforced molded product 10, the reinforcing material thermosetting resin preferably has flame retardant. Phenolic resin is suitable as the reinforcing material thermosetting resin because phenolic resin has a good flame retardant. In addition, the core material thermosetting resin and the reinforcing material thermosetting resin may be the same thermosetting resin.

Preferably, when melamine resin is used as resin foam for the core material 11 and phenolic resin is used as the core material thermosetting resin and the reinforcing material thermosetting resin, a fiber-reinforced molded product having flame retardant sufficient for a housing of portable devices, such as laptop computers, can be obtained even if an additional flame retardant material is not used.

Preferably, the total amount of the thermosetting resin including the core material thermosetting resin and the reinforcing material thermosetting resin in the entire fiber-reinforced molded product 10 is set such that a resin ratio R (weight percentage) expressed by Equation (B1) below is 50% to 80%, more particularly 55% to 70%. Due to such a resin ratio, the fiber-reinforced molded product 10 can be enhanced in terms of lightness and stiffness, even if the thickness thereof is reduced.

$$R=(Wb-Wa)/Wb\times 100 \qquad (B1)$$

(Wa: a total weight of the core material member, the fiber fabric and a porous sheet, Wb: a total weight of the core material member, the fiber fabric and the porous sheet after impregnation of the thermosetting resin, and R: a resin ratio)

If the thermosetting resin dissolved in a solvent is used, the weight after impregnation of the thermosetting resin in Equation (B1) of the resin ratio is the weight after removing the solvent by drying after impregnation.

The surface material 25 is formed of a porous sheet into which at least one thermosetting resin of the core material thermosetting resin and the reinforcing material thermosetting resin (hereinafter, when the core material thermosetting resin and the reinforcing material thermosetting resin are described without being specifically distinguished from each other, the core material thermosetting resin and the reinforcing material thermosetting resin are referred to as only thermosetting resin) is impregnated and cured. Also, during a compressing and heating step in manufacturing of the fiber-reinforced molded product 10 as described below, the thermosetting resin impregnated into the porous sheet is oozed out to a surface of the porous sheet and cured on the surface, so that a smoothed resin layer is formed on the surface of the surface material 25. As a result, the surface material 25 has a surface roughness of 30 μm or less, more preferably 24 μm or less. If the surface roughness is greater than 30 μm, unevenness can be observed on the surface of the surface material 25 after the surface is coated, and as a result, it is difficult to obtain a well coated surface. Also, when the surface of the surface material 25 is polished after the thermosetting resin is cured, the surface roughness can be further reduced.

The surface material as described above is formed by impregnating the thermosetting resin into the porous sheet having open cells, the number of cells being 8 to 80 cells/25 mm by capillary action and then curing the thermosetting resin. Accordingly, the thermosetting resin can easily ooze out to the surface through open cells, and thus the thermosetting resin oozed out to the surface of the surface material can form a smooth surface. As a result, the surface roughness of the surface material is made to be 30 μm or less, thereby achieving the fiber-reinforced molded product having a reduced surface roughness and a good appearance.

Also, because the most of the smooth surface is formed of the thermosetting resin oozed out of the porous sheet, the surface is integrated with the fiber-reinforced molded product, thereby preventing the surface from being peeled off together with a coating film. In addition, the thermosetting resin has a high adhesion to the coating film, thereby achieving a good coating film adhesion.

The porous sheet is formed of a porous material having open cells to allow the thermosetting resin to be well impregnated and to form an even resin layer on the surface thereof. A material for the porous sheet is not particularly limited, but in addition to porosity, is preferably a material which is not melt by heat in the compressing and heating step and has heat resistance sufficient to prevent the cells from being closed. The type of the porous sheet is not also particularly limited and can be properly selected from a woven fabric, a non-woven fabric, a paper, a foam and the like.

When a resin foam having open cells is used as the porous sheet, the resin foam has stable resin skeletons as compared to a porous body formed of fibers, thereby keeping pores. As a result, permeability of air and flowability of matrix resin can be enhanced and the thermosetting resin can easily ooze out to the surface of the porous sheet, so that the smooth surface can be easily achieved. Among resin foams having open cells, the porous sheet formed of an urethane resin foam is preferred in that the porous sheet can be easily handled, have a good lightness, and effectively decrease stepped portions in texture gaps and the like of the fiber fabric of the fiber reinforcing material 21 by compression.

Also, when the porous sheet is formed of an urethane resin foam, it is more preferable that cell membranes be removed by a known membrane removing treatment, such as a dissolution treatment or an explosion treatment. The urethane resin foam, from which cell membranes are removed, has an open cell structure providing a good liquid permeability, so that the thermosetting resin is easy to be impregnated into the porous sheet and then to oozed out to the surface of the porous sheet during the compressing and heating step. Thus, the core material 11 is more securely integrated with the fiber reinforcing material 21 and the surface material 25 by curing of the thermosetting resin, and also the smooth surface is easily obtained by curing of the thermosetting resin oozed out of the surface of the porous sheet.

Contrarily, the urethane resin foam, from which cell membranes are not removed, has cell membranes remained therein, so that impregnation and exudation of the thermosetting resin are poor when using as the porous sheet. As a result, surface smoothness and coating adhesion (i.e., a degree of difficulty in peeling off a coating film) are decreased.

The porous sheet has preferably a cell number of 8 to 80 cells/25 mm (JIS K6400-1). If the cell number is smaller than 8 cells/25 mm, pores (pores space) are excessively large when being processed in a thin sheet form, and thus tend to be difficult to hold an amount of the thermosetting resin required to fill unevenness of the fiber fabric. Contrarily, if the cell number is greater than 80 cells/25 mm, pores become small to decrease impregnating ability of the thermosetting resin, and thus the thermosetting resin is difficult to be sufficiently oozed out of the surface of the porous sheet.

A thickness of the porous sheet used can be varied depending on a material thereof, but is 0.4 mm to 3.0 mm in an uncompressed state (before manufacturing of the fiber-reinforced molded product), preferably 0.6 mm to 3.0 mm. If the thickness in the uncompressed state is smaller than 0.4 mm, it is difficult to form a uniform resin layer on the surface of the surface material 25 during the compressing and heating step in manufacturing of the fiber-reinforced molded product 10, thereby decreasing surface smoothness of the fiber-reinforced molded product 10. Contrarily, if the thickness of the porous sheet in the uncompressed state (before manufacturing of the fiber-reinforced molded product) is greater that 3.0 mm, the flexural modulus of the fiber-reinforced molded product 10 is decreased and also the thermosetting resin tends to be non-uniformly oozed out of the porous sheet upon manufacturing of the fiber-reinforced molded product 10, thereby decreasing surface smoothness of the surface material 25.

The integration of the core material 11 with the fiber reinforcing material 21 and the surface material 25 can be performed by applying or impregnating the thermosetting resin on or into at least one of the core material and the fiber fabric, laminating the fiber fabric and the porous sheet in this order on at least one surface of the core material, and then curing the thermosetting resin in a compressed state.

When the thermosetting resin is applied on or impregnated into both of the core material and the fiber fabric, the core material thermosetting resin and the fiber reinforcing material thermosetting material may be the same type or different types, but the same type is preferred for a good adhesion between the core material 11 and the fiber reinforcing material 21.

Figure 2:
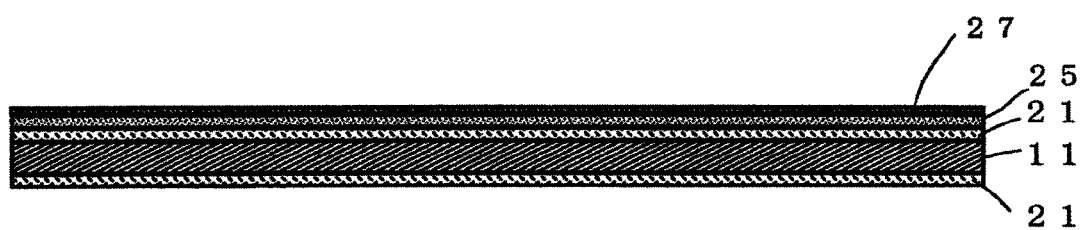
FIG. 2 is a cross sectional view showing the fiber-reinforced molded product of FIG. 1 in which a coating film is provided on a surface of a surface material thereof.

The surface of the surface material 25 of the fiber-reinforced molded body 10 is coated in a method depending on use, to form a coating film. Examples of coating materials include urethane-based, acrylic-based, polyester-based, acetic acid-based coatings and the like, and examples of the method of coating include spraying, coater processing, dipping and the like. Although an amount of coating is determined optionally, the coating film 27 can be, for example, formed to have a film thickness of 5 to 40 µm. FIG. 2 shows the fiber-reinforced molded product provided with the coating film 27 by coating the surface of the surface material 25. The surface roughness of the coating film 27 is 25 µm or less, more preferably less than 20 µm.

Meanwhile, the fiber reinforcing materials 21 were preferably laminated on both surfaces of the core material 11. When the fiber reinforcing materials 21 were laminated on both surfaces, the tensile strength in both surfaces of the fiber-reinforced molded product can be enhanced and the bending strength of the entire fiber-reinforced molded product is enhanced. In this case, when considering only the tensile strength, the fiber reinforcing material 21 can be preferably disposed in the outermost layer of the fiber-reinforced molded product However, upon manufacturing of the fiber-reinforced molded product, a case in which the thermosetting resin is not crowded around the surface of the fiber fabric of the fiber reinforcing material 21 can occur, thereby causing unevenness in the surface and in turn deteriorating the appearance of the fiber-reinforced molded product. Therefore, the surface material (porous sheet) 25, which is well compatible with the thermosetting resin and is thinner than the core material 11, is disposed on the fiber fabric to form pores, into which the thermosetting resin is to be flowed, in the surface of the fiber fabric, so that the porous sheet can soak up the thermosetting resin, which has penetrated through the fiber fabric, by capillary action. Then, by curing a thin layer of the thermosetting resin oozed out to the surface of the porous sheet is cured, a smooth surface can be formed on the fiber-reinforced molded product. Thus, the fiber-reinforced molded product, of which the bending strength is compatible with the appearance, can be achieved.

Hereinafter, methods for manufacturing a fiber-reinforced molded product according to embodiments 1-(1) to 1-(4) of the present invention will be described.

<Embodiment 1-(1)>

Firstly, a method for manufacturing a fiber-reinforced molded product according to the embodiment 1-(1) of the present invention will be described with reference to FIG. 3. The method for manufacturing a fiber-reinforced molded product 10 includes an impregnating step, a laminating step, and a compressing and heating step, as described below. In the method for manufacturing the fiber-reinforced molded product according to the embodiment 1-(1) as described below, a fiber fabric 21A only is impregnated with a reinforcing material thermosetting resin 21B during the impregnating step.

Figure 3:
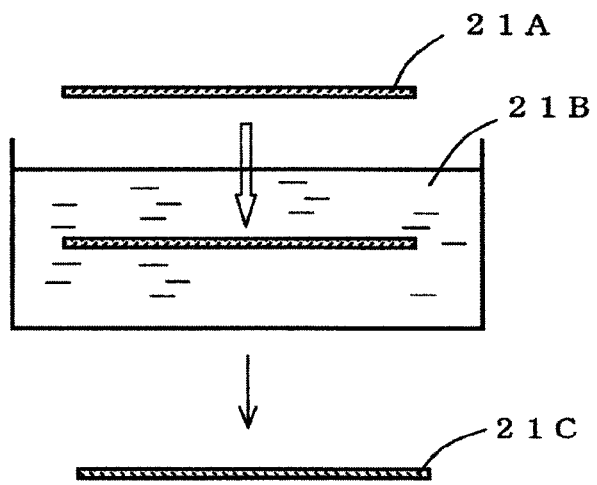
FIG. 3 is a view showing steps of a manufacturing method according to an embodiment 1-(1) of the present invention.
Figure 3:
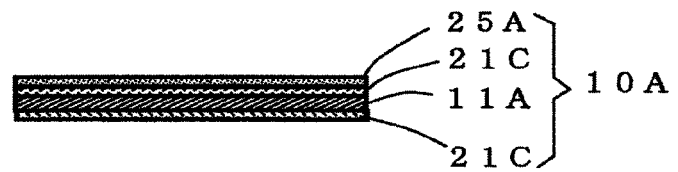
Figure 3:
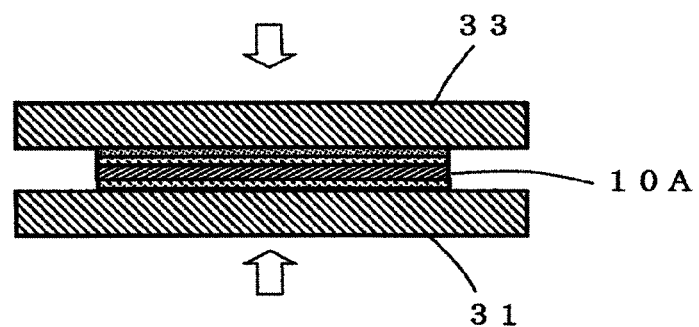

In the impregnating step as shown in FIG. 3(3-1), the reinforcing material thermosetting resin 21B is impregnated into or applied on the fiber fabric 21A, thereby an impregnated fiber fabric 21C. As used herein, the term 'impregnation' means that, in addition to immersing the fiber fabric 21A into a bath containing the reinforcing material thermosetting resin 21B in a liquid state as shown, the reinforcing material thermosetting resin is adhered or applied by a sprayer or a roll coater, or the reinforcing material thermosetting resin 21B is suitably held in the fiber fabric 21 in other manners.

For the fiber fabric 21A and the reinforcing material thermosetting resin 21B, materials as described above are used. The reinforcing material thermosetting resin 21B is formed of an un-cured liquid. Also, the reinforcing material thermosetting resin 21B is preferably dissolved in a solvent to facilitate impregnation, and after impregnation, the impregnated fiber fabric 21C is dried at a temperature which does not cause a curing reaction of the reinforcing material thermosetting resin 21B, thereby removing the solvent from the impregnated fiber fabric 21C.

In this impregnating step, the reinforcing material thermosetting resin 21B is preferably impregnated into the fiber fabric 21A, so that a resin ratio R expressed by Equation (B1) below is 50% to 80%, particularly 55% to 70%.

$$R=(Wb-Wa)/Wb\times100 \quad (B1)$$

(Wa: a total weight of a core material member, the fiber fabric and a porous sheet, Wb: a total weight of the core material member, the fiber fabric and the porous sheet after impregnation of the thermosetting resin, and R: a resin ratio)

In the impregnating step, the total weight of the thermosetting resin 21B impregnated into the fiber fabric 21A is a value equal to Wb−Wa in Equation (B1) of the resin ratio R. Also, if the thermosetting resin dissolved in a solvent is used, the weight after impregnation of the thermosetting resin in Equation (B1) of the resin ratio R is the weight after removing the solvent by drying after impregnation.

Then, in the laminating step as shown in FIG. 3(3-2), the impregnated fiber fabrics 21C are disposed on both surfaces of the core material member 11A, and then a porous sheet 25A is additionally disposed on a surface of the impregnated fiber fabric 21C at one side of the core material member 11A, thereby obtaining a laminate 10A. For the core material member 11A and the porous sheet 25A, materials as described above are used. The porous sheet 25A used here is a sheet having open cells with a cell number of 8 to 80 cells/25 mm and a thickness of 0.4 to 3.0 mm.

The laminating operation may be performed by superimposing the impregnated fiber fabric 21C, the core material member 11A, the impregnated fiber fabric 21C and the porous sheet 25 in this order, on an upper surface of a lower mold (a lower press forming mold) 31 used in the subsequent compressing and heating step. In addition, the impregnated fiber fabric 21C, the core material member 11A and the porous sheet 25A are preferably the same in plane size, but if different, may be trimmed after compressing and heating step as described below.

Next, in the compressing and heating step as shown in FIG. 3(3-3), the laminate 10A is heated and compressed by the lower mold 31 and an upper mold 33. A compression degree is set such that a compression rate C defined by Equation A1 below becomes 200 to 5000%, preferably 1000 to 2,600%. By this range in the compression rate C, thinning and stiffness of the fiber reinforced molded product 110 can be enhanced.

$$C=(Tb-Ta)/Ta\times100 \quad (A1)$$

(Ta: a thickness of the core material member after compression, Tb: a thickness of the core material member before compression, C: a compression rate).

The compression is preferably performed such that the laminate 10A has a thickness of 0.3 to 2.0 mm. In the compressing and heating step, a spacer is disposed at an appropriate position between the lower mold 31 and the upper mold 33, so that a distance spaced between the lower mold 31 and the upper mold 33 becomes a predetermined gap (i.e., a predetermined compressed thickness of the laminate 10A). Also, a method for heating the laminate 10A is not particularly limited, but performing heating through the lower mold 31 and the upper mold 33 provided with heating means, such as a heater, is a simple method. A heating temperature is set to be equal to or higher than a curing reaction temperature of the reinforcing material thermosetting resin 21B impregnated.

When the laminate 10A is compressed during the compressing and heating step, the reinforcing material thermosetting resin 21B is extruded from the impregnated fiber fabric 21C of the laminate 10A, to be impregnated into or applied on the core material member 11A in contact with the impregnated fiber fabric 21C and also impregnated into the porous sheet 25A. The reinforcing material thermosetting resin 21B impregnated into the porous sheet 25A is oozed out to a surface of the porous sheet 25A and cured, thereby forming a resin layer having a smooth surface.

In this way, because the surface material 25 is formed by impregnating the thermosetting resin 21B into the porous sheet 25A having open cells, the number of cells being 8 to 80 cells/25 mm by capillary action and then curing the thermosetting resin 21B, the thermosetting resin 21B can easily ooze out to the surface through open cells. Thus, the thermosetting resin 21B oozed out to the surface of the surface material 25 forms a smooth surface. As a result, the surface roughness of the surface material 25 can become 30 μm or less, thereby achieving the fiber-reinforced molded product having a reduced surface roughness and a good appearance. Also, because the smooth surface is formed of the thermosetting resin 21B oozed out of the porous sheet 21A, the smooth surface is integrated with the fiber-reinforced molded product, thereby preventing the surface from being peeled off together with the coating film 27. In addition, the thermosetting resin 21B has a high adhesion to the coating film 27, thereby achieving a good coating film adhesion.

During the compressing and heating step, the surplus reinforcing material thermosetting resin 21B exceeding a space volume of the core material member 11A, the fiber fabric 21A and the porous sheet 25A after compression is extruded to the outside of the molds. Also, the reinforcing material thermosetting resin 21B is densely filled such that no pores are substantially present in the laminate 10A, except micro voids present in the reinforcing material thermosetting resin 21B or micro pores unintentionally created therein. As a result, the stiffness of the laminate 10A can be enhanced.

The curing reaction of the reinforcing material thermosetting resin 21B impregnated into the laminate 10A is initiated by heating and thus the reinforcing material thermosetting resin 21B is cured in a state that the laminate 10A is compressed. When the core material member 11A has open cells, the reinforcing material thermosetting resin 21B impregnated into the impregnated fiber fabric 21C is oozed out and impregnated into the core material member 11A, and the reinforcing material thermosetting resin 21B is cured in a state that the laminate 10A is compressed. Also, when the porous sheet 25A is formed of an urethane resin foam, the reinforcing material thermosetting resin is cured in a state that the porous sheet 25A is also compressed. Thus, the core material member 11A, the fiber fabric 21A and the porous sheet 25A are integrated by curing of the reinforcing material thermosetting resin 21B.

As a result, the core material 11 is formed by the core material member 11A, the fiber reinforcing material 21 is formed by the impregnated fiber fabric 21C, the surface material 25 is formed by the porous sheet 25A, and the core material 11, the fiber reinforcing material 21 and the surface material 25 are integrated by the reinforcing material thermosetting resin, thereby forming the fiber-reinforced molded product 10.

Then, when heating and compressing is stopped, the fiber-reinforced molded product 10 can be obtained. In this way, the surface of the surface material 25 of the fiber-reinforced molded product 10 become a smooth surface by curing of the reinforcing material thermosetting resin 21B oozed out to the surface of the porous sheet 25A.

Also, when the resin ratio R and the compression rate C are set to the predetermined ranges as described above, the fiber-reinforced molded product, which has a light weight and a high stiffness, can be provided. In this time, to achieve a high compression rate, a resin foam is preferably used as the core material member 11A.

When a core material member having open cells is used as the core material member 11A, the thermosetting resin 21B is adhered on an open cell structure of the core material member 11A, so that the thermosetting resin 21B is uniformly dispersed in the core material member 11A. In this state, by curing the thermosetting resin 21B, the thermosetting resin 21B can be densely filled in the core material member 11A, thereby obtaining the fiber-reinforced molded product in which the bending strength and the adhesive strength between the core material and the fiber reinforcing material 21 are enhanced.

Also, when the compression rate C and the resin ratio R defined by Equations (A1) and (B1) are respectively set to ranges of 200 to 5000% and 50 to 80%, sizes of micro pores contained in the fiber-reinforced molded product can be reduced. In addition, when the compression rate C and the resin ratio R are set to the predetermined ranges and also a resin foam is used as the core material member 11A, uniformity of foam resin strands of the resin foam dispersed in the thermosetting resin 21B can be enhanced, so that the strength of the fiber-reinforced molded product can be uniformed. In other words, portions of the fiber reinforced molded product which are weak in strength are removed. In this case, when the fiber-reinforced molded product is manufactured by curing the resin foam in a compressed state, distances between strands of the resin foam become smaller than distances between strands before compression, and the skeletons of the resin foam are also flattened in a direction of the thickness of the fiber-reinforced molded product.

<Embodiment 1-(2)>

Next, a fiber-reinforced molded product and a method for manufacturing the same according to the embodiment 1-(2) of the present invention will be described with reference to FIG. 4.

In the foregoing embodiment 1-(1), the fiber fabric 21A is impregnated with the reinforcing material thermosetting resin 21B during the impregnating step, thereby forming the impregnated fiber fabric 21C. Contrarily, in the embodiment 1-(2), the core material member 11A is impregnated with a core material thermosetting resin 11B during the impregnating step, thereby forming an impregnated core material member 11C.

When a resin foam having open cells is used as the core material member 11A, the core material thermosetting resin 11B is impregnated into the core material member 11A. On the other hand, when a member, such as a non-porous member, which is difficult to be impregnated, is used as the core material member 11A, the core material thermosetting resin 11B may be adhered on the surface of the core material member 11A. Meanwhile, in the following description, unless otherwise mentioned, adhering the core material thermosetting resin 11B on the surface of the core material member 11A is also intended to include impregnating the core material thermosetting resin 11B into the core material member 11A.

The core material member 11A and the core material thermosetting resin 11B are the same as described with respect to the fiber-reinforced molded material 10. The core material thermosetting resin 11B used in the impregnating step is formed of an un-cured liquid. Also, the core material thermosetting resin 11B is preferably dissolved in a solvent to facilitate impregnation, and after impregnation, the impregnated core material member 11C is dried at a temperature which does not cause a curing reaction of the core material thermosetting resin 11B, thereby removing the solvent from the impregnated core material member 11C.

The impregnation is preformed by a suitable method, such as immersing the core material member 11A into a bath containing the core material thermosetting resin 11B in a liquid state, applying the thermosetting resin by a sprayer, or applying the thermosetting resin by a roll coater. The core material thermosetting resin 11B is preferably impregnated into or adhered on the core material 11A, so that the resin ratio R as described above is 50% to 80%, particularly 55% to 70%. In the impregnating step, the weight of the core material thermosetting resin 11B impregnated into the core material member 11A is a value equal to Wb−Wa in Equation (B1) of the resin ratio R. If the thermosetting resin dissolved in a solvent is used, the weight after impregnation of the thermosetting resin in Equation of the resin ratio R is the weight after removing the solvent by drying after impregnation.

Figure 4:
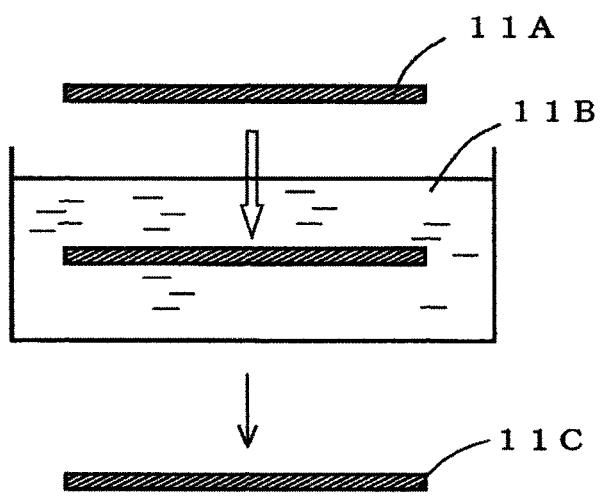
FIG. 4 is a view showing steps of a manufacturing method according to an embodiment 1-(2) of the present invention.
Figure 4:
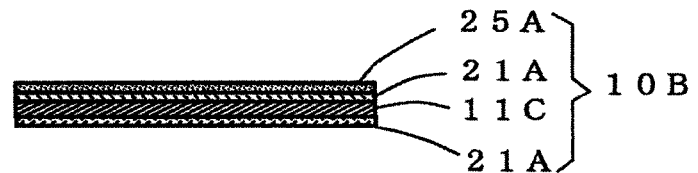
Figure 4:
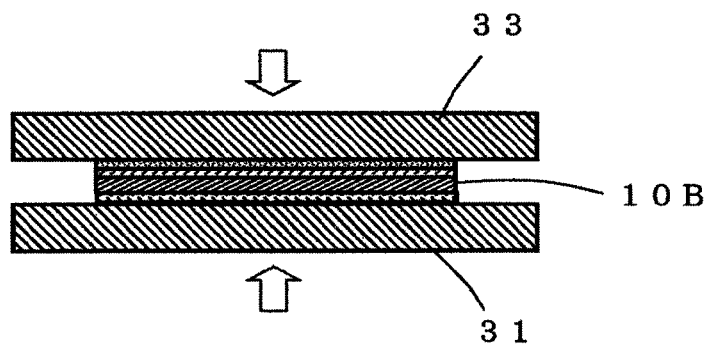

Then, in a laminating step as shown in FIG. 4(4-2), the fiber fabrics 21A are disposed on both surfaces of the impregnated core material member 11C, and then a porous sheet 25A is additionally disposed on a surface of the fiber fabric 21A at one side of the impregnated core material member 11C, thereby obtaining a laminate 10B. The fiber fabric 21A and the porous sheet 25A are the same as described with respect to the fiber-reinforced molded product 10.

The laminating operation may be performed by superimposing the fiber fabric 21A, the impregnated core material member 11C, the fiber fabric 21A and the porous sheet 25 in this order, on an upper surface of a lower mold 31 used in the subsequent compressing and heating step. In addition, the impregnated core material member 11C, the fiber fabric 21A and the porous sheet 25A are preferably the same in plane size, but if different, may be trimmed after compressing and heating step as described below.

Next, in the compressing and heating step as shown in FIG. 4(4-3), the laminate 10B is heated and compressed by the lower mold 31 and an upper mold 33. A compression degree is set such that a compression rate C defined by Equation (A1) below becomes 200 to 5000%, preferably 1000 to 2600%. By this range in the compression rate C, thinning and stiffness of the fiber reinforced molded product 110 can be enhanced.

$$C=(Tb-Ta)/Ta\times100 \tag{A1}$$

(Ta: a thickness of the core material member after compression, Tb: a thickness of the core material member before compression, C: a compression rate)

The compression is preferably performed such that the laminate 10B has a thickness of 0.3 to 2.0 mm. In the compressing and heating step, a spacer is disposed at an appropriate position between the lower mold 31 and the upper mold 33, so that a distance spaced between the lower mold 31 and the upper mold 33 becomes a predetermined spacing (i.e., a predetermined compressed thickness of the laminate). Also, a method of heating the laminate is not particularly limited, but performing heating through the lower mold 31 and the upper mold 33 provided with heating means, such as a heater, is a simple method. A heating temperature is set to be equal to or higher than a curing reaction temperature of the core material thermosetting resin 11B impregnated.

When the laminate 10B is compressed during the compressing and heating step, if the core material member 11A is formed of a resin foam having open cells, the core material thermosetting resin 11B is extruded from the impregnated core material member 11C, to be impregnated into or applied on the fiber fabric 21A in contact with the impregnated core material member 11C and also impregnated into the porous sheet 25A. On the other hand, if the core material member 11A is formed of a member, such as a non-porous member, which is difficult to be impregnated, the core material thermosetting resin 11B is impregnated into the fiber fabric 21A and also into the porous sheet 25A from a surface of the adhered core material member 11C by compression.

The core material thermosetting resin 11B impregnated into the porous sheet 25A is oozed out to a surface of the porous sheet 25A by compression and cured, thereby forming a smooth surface formed of a resin layer.

In this way, because the surface material 25 is formed by impregnating the thermosetting resin 11B into the porous sheet 25A having open cells, the number of cells being 8 to 80 cells/25 mm by capillary action and then curing the thermosetting resin 11B, the thermosetting resin 11B can easily ooze out to the surface through open cells. Thus, the thermosetting resin 11B oozed out to the surface of the surface material 25 forms a smooth surface. As a result, the surface roughness of the surface material 25 is made to be 30 μm or less, thereby achieving the fiber-reinforced molded product having a reduced surface roughness and a good appearance. Also, because the smooth surface is formed of the thermosetting resin 11B oozed out of the porous sheet 21A, the smooth surface is integrated with the fiber-reinforced molded product, thereby preventing the surface from being peeled off together with the coating film 27. In addition, the thermosetting resin 11B has a high adhesion to the coating film 27, thereby achieving a good coating film adhesion.

During compression, the surplus core material thermosetting resin 11B exceeding a space volume of the core material member 11A, the fiber fabric 21A and the porous sheet 25A after compression is extruded to the outside of the molds. Also, the core material thermosetting resin 11B is densely filled such that no pores are substantially present in the laminate 10B, except micro voids present in the core material thermosetting resin 11B or micro pores unintentionally created therein. As a result, the stiffness of the fiber-reinforced molded product 10 can be enhanced.

The curing reaction of the core material thermosetting resin 11B impregnated throughout the laminate 10B is initiated by heating and thus the core material thermosetting resin 11B is cured in a compressed state. When the core material member 11A is formed of a resin foam having open cells, the core material thermosetting resin 11B is cured in a compressed state. Also, when the porous sheet 25A is formed of an urethane resin foam, the core material thermosetting resin 11B is cured in a state that the porous sheet 25A is also compressed By the compressing and heating step as described above, the core material 11 is formed by the impregnated core material member 11C, the fiber reinforcing material 21 is formed by the fiber fabric 21A, the surface material 25 is formed by the porous sheet 25A, and the core material 11, the fiber reinforcing material 21 and the surface material 25 are integrated, thereby obtaining the fiber-reinforced molded product 10. Then, when such heating and compressing is stopped, the fiber-reinforced molded product 10 can be obtained. In this way, a resin layer having a smooth surface is formed on the surface of the surface material 25 of the fiber-reinforced molded product 10 by curing of the core material thermosetting resin 11B oozed out to the surface of the porous sheet 25A.

Also, when the resin ratio R and the compression rate C are set to the predetermined ranges as described above, the fiber-reinforced molded product, which has a light weight and a high stiffness, can be provided. In this time, to achieve a high compression rate, a resin foam is preferably used as the core material member 11A.

When a core material member having open cells is used as the core material member 11A, the thermosetting resin 11B is adhered on an open cell structure of the core material member 11A, so that the thermosetting resin 11B is uniformly dispersed in the core material member 11A. In this state, by curing the thermosetting resin 11B, the thermosetting resin 11B can be densely filled in the core material member 11A, thereby obtaining the fiber-reinforced molded product in which the bending strength and the adhesive strength between the core material and the fiber reinforcing material 21 are enhanced.

Also, when the compression rate C and the resin ratio R defined by Equations (A1) and (B1) are respectively set to ranges of 200 to 5000% and 50 to 80%, sizes of micro pores contained in the fiber-reinforced molded product can be reduced. In addition, when the compression rate C and the resin ratio R are set to the predetermined ranges and also a resin foam is used as the core material member 11A, uniformity of foam resin strands of the resin foam dispersed in the thermosetting resin 11B can be enhanced, so that the strength of the fiber-reinforced molded product can be uniformed. In other words, portions of the fiber reinforced molded product which are weak in strength are removed. In this case, when the fiber-reinforced molded product is manufactured by curing the resin foam in a compressed state, distances between strands of the resin foam become smaller than distances between strands before compression, and the skeletons of the resin foam are also flattened in a direction of the thickness of the fiber-reinforced molded product.

<Embodiment 1-(3)>

Next, a method for manufacturing a fiber-reinforced molded product according to the embodiment 1-(3) of the present invention will be described with reference to FIG. 5. In the foregoing embodiments 1-(1) and 1-(2), either one of the core material member 11A and the fiber fabric 21A is impregnated with the thermosetting resin 11B or 21B. However, in an impregnating step according to this embodiment, as shown in FIG. 5(5-1), the core material member 11A is impregnated with the core material thermosetting resin 11B to obtain the impregnated core material member 11C, and the fiber fabric 21A is also impregnated with the reinforcing material thermosetting resin 21B to form the impregnated fiber fabric 21C.

The core material member 11A, the core material thermosetting resin 11B, the fiber fabric 21A and the reinforcing material thermosetting resin 21B are the same as described with respect to the fiber-reinforced molded material 10. The thermosetting resins 11B and 21B used during impregnation are formed of un-cured liquids Also, the thermosetting resins 11B and 21B are preferably dissolved in a solvent to facilitate impregnation, and after impregnation, the impregnated core material member 11C and the impregnated fiber fabric 21C is dried at a temperature which does not cause a curing reaction of the thermosetting resins 11B and 21B, thereby removing the solvent from the impregnated core material member 11C and the impregnated fiber fabric 21C. The impregnation is preformed by a suitable method, such as immersing the core material member 11A or the fiber fabric 21A into a bath containing the thermosetting resin 11B or 21B in a liquid state, applying the thermosetting resin by a sprayer, or applying the thermosetting resin by a roll coater.

In the impregnating step, impregnation of the core material thermosetting resin 11B into the core material 11A and impregnation of the reinforcing material thermosetting resin 21B into the fiber fabric 21A are preferably performed so that the resin ratio R is 50% to 80%, particularly 55% to 70%. In the impregnating step, the sum of the weight of the core material thermosetting resin 11B impregnated into the core material member 11A and the weight of the reinforcing material thermosetting resin 21B impregnated into the fiber fabric 11A is a value equal to Wb−Wa in Equation (B1) of the resin ratio. If the thermosetting resins dissolved in a solvent are used, the weight after impregnation of the thermosetting resins in Equation of the resin ratio is the weight after removing the solvent by drying after impregnation.

Figure 5:
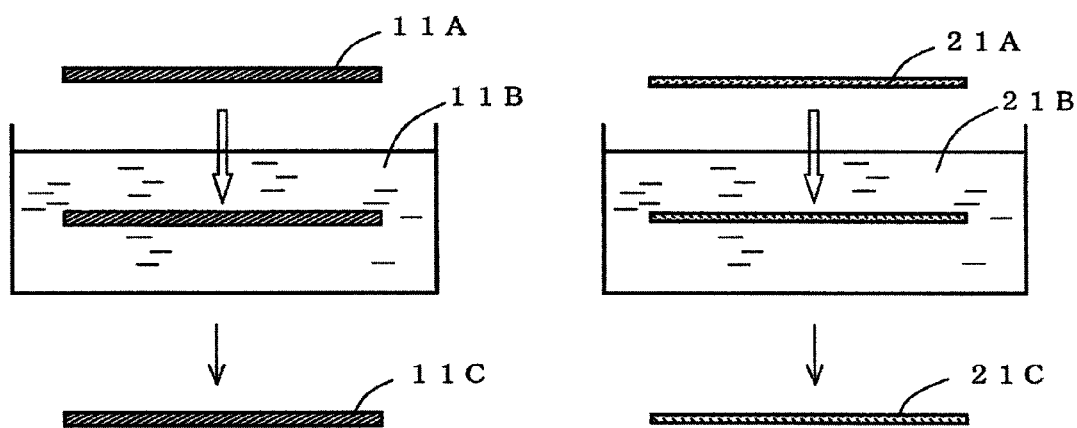
FIG. 5 is a view showing steps of a manufacturing method according to an embodiment 1-(3) of the present invention.
Figure 5:
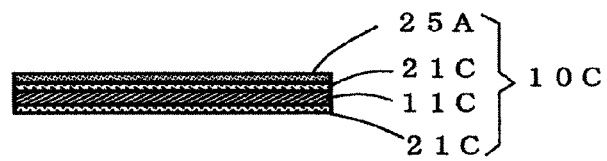
Figure 5:
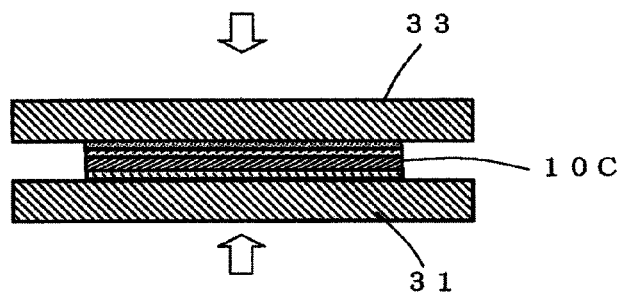

In the laminating step as shown in FIG. 5(5-2), the impregnated fiber fabrics 21C are disposed on both surfaces of the impregnated core material member 11C, and then a porous sheet 25A is additionally disposed on a surface of the impregnated fiber fabric 21C at one side of the impregnated core material member 11C, thereby obtaining a laminate 10C. The porous sheet 25A is the same as described with respect to the fiber-reinforced molded product 10.

The laminating operation may be performed by superimposing the impregnated fiber fabric 21C, the impregnated core material member 11C, the impregnated fiber fabric 21C and the porous sheet 25 in this order, on an upper surface of a lower mold 31 used in the subsequent compressing and heating step. In addition, the impregnated core material member 11C, the impregnated fiber fabric 21C and the porous sheet 25A are preferably the same in plane size, but if different, may be finally trimmed after compressing and heating step as described below.

Next, in the compressing and heating step as shown in FIG. 5(5-3), the laminate 10C is heated and compressed by the lower mold 31 and an upper mold 33. A compression degree is set such that a compression rate C defined by Equation (A1) below becomes 200 to 5000%, preferably 1000 to 2600%. By this range in the compression rate C, thinning and stiffness of the fiber reinforced molded product 110 can be enhanced.

$$C=(Tb-Ta)/Ta \times 100 \quad (A1)$$

(Ta: a thickness of the core material member after compression, Tb: a thickness of the core material member before compression, C: a compression rate)

The compression is preferably performed such that the laminate 10C has a thickness of 0.3 to 2.0 mm. In the compressing and heating step, a spacer is disposed at an appropriate position between the lower mold 31 and the upper mold 33, so that a distance spaced between the lower mold 31 and the upper mold 33 becomes a predetermined spacing (i.e., a predetermined compressed thickness of the laminate).

A method of heating is not particularly limited, but performing heating through the lower mold 31 and the upper mold 33 provided with heating means, such as a heater, is a simple method. A heating temperature is set to be equal to or higher than a curing reaction temperature of the thermosetting resins impregnated.

By compression in the compressing and heating step, the reinforcing material thermosetting resin 21B in the impregnated fiber fabric 21C can be securely contacted with the core material thermosetting resin 11B in the impregnated core material member 11C, and the reinforcing material thermosetting resin 21B can be also securely impregnated into the porous sheet 25A. Also, the reinforcing material thermosetting resin 21B impregnated into the porous sheet 25A is oozed out to a surface of the porous sheet 25A, thereby forming a resin layer having a smooth surface.

In this way, because the surface material 25 is formed by impregnating the thermosetting resins 11B and 21B into the porous sheet 25A having open cells, the number of cells being 8 to 80 cells/25 mm by capillary action and then curing the thermosetting resins 11B and 21B, the thermosetting resins 11B and 21B can easily ooze out to the surface through open cells. Thus, the thermosetting resins 11B and 21B oozed out to the surface of the surface material 25 forms a smooth surface. As a result, the surface roughness of the surface material 25 is made to be 30 μm or less, thereby achieving the fiber-reinforced molded product having a reduced surface roughness and a good appearance. Also, because the smooth surface is formed of the thermosetting resins 11B and 21B oozed out of the porous sheet 21A, the smooth surface is integrated with the fiber-reinforced molded product, thereby preventing the surface from being peeled off together with the coating film 27. In addition, the thermosetting resins 11B and 21B have a high adhesion to the coating film 27, thereby achieving a good coating film adhesion.

The surplus thermosetting resins 11B and 21B exceeding a space volume of the core material member 11A, the fiber fabric 21A and the porous sheet 25A after compression is extruded to the outside of the molds. Also, the thermosetting resins 11B and 21B are densely filled such that no pores are substantially present in the fiber-reinforced molded product 10, except micro voids present in the thermosetting resins 11B and 21B or micro pores unintentionally created therein. As a result, the stiffness of the fiber-reinforced molded product can be enhanced.

The curing reaction of the thermosetting resins 11B and 21B is initiated by heating during the compressing and heating step, and thus the laminate 10C is cured in a compressed state. When the core material member 11A is formed of a resin foam having open cells, the core material thermosetting resin 11B is cured in a compressed state. Also, when the porous sheet 25A is formed of an urethane resin foam, the reinforcing material thermosetting resin 21B is cured in a state that the porous sheet 25A is also compressed.

Thus, the core material 11 is formed by the impregnated core material member 11C, the fiber reinforcing material 21 is formed by the impregnated fiber fabric 21C, the surface material 25 is formed by the porous sheet 25A, and the core material 11, the fiber reinforcing material 21 and the surface material 25 are integrated, thereby forming the fiber-reinforced molded product 10. Then, when such heating and compressing is stopped, the fiber-reinforced molded product 10 can be obtained. In this way, a resin layer having a smooth surface is formed on the surface of the surface material 25 of the fiber-reinforced molded product 10 by curing of the thermosetting resin oozed out to the surface of the porous sheet 25A.

Also, when the resin ratio R and the compression rate C are set to the predetermined ranges as described above, the fiber-reinforced molded product, which has a light weight and a high stiffness, can be provided. In this time, to achieve a high compression rate, a resin foam is preferably used as the core material member 11A.

When a core material member having open cells is used as the core material member 11A, the thermosetting resins 11B and 21B are adhered on an open cell structure of the core material member 11A, so that the thermosetting resins 11B and 21B are uniformly dispersed in the core material member 11A. In this state, by curing the thermosetting resins 11B and 21B, the thermosetting resins 11B and 21B can be densely filled in the core material member 11A, thereby obtaining the fiber-reinforced molded product in which the bending strength and the adhesive strength between the core material and the fiber reinforcing material are enhanced.

Also, when the compression rate C and the resin ratio R defined by Equations (A1) and (B1) are respectively set to ranges of 200 to 5000% and 50 to 80%, sizes of micro pores contained in the fiber-reinforced molded product can be reduced. In addition, when the compression rate C and the resin ratio R are set to the predetermined ranges and also a resin foam is used as the core material member 11A, uniformity of foam resin strands of the resin foam dispersed in the thermosetting resins 11B and 21B can be enhanced, so that the strength of the fiber-reinforced molded product can be uniformed. In other words, portions of the fiber reinforced molded product which are weak in strength are removed. In this case, when the fiber-reinforced molded product is manufactured by curing the resin foam in a compressed state, distances between strands of the resin foam become smaller than distances between strands before compression, and the skeletons of the resin foam are also flattened in a direction of the thickness of the fiber-reinforced molded product.

<Embodiment 1-(4)>

Hereinafter, a fiber-reinforced molded product and a method for manufacturing the same according to the embodiment 1-(4) of the present invention will be described with reference to FIG. 6.

Figure 6:
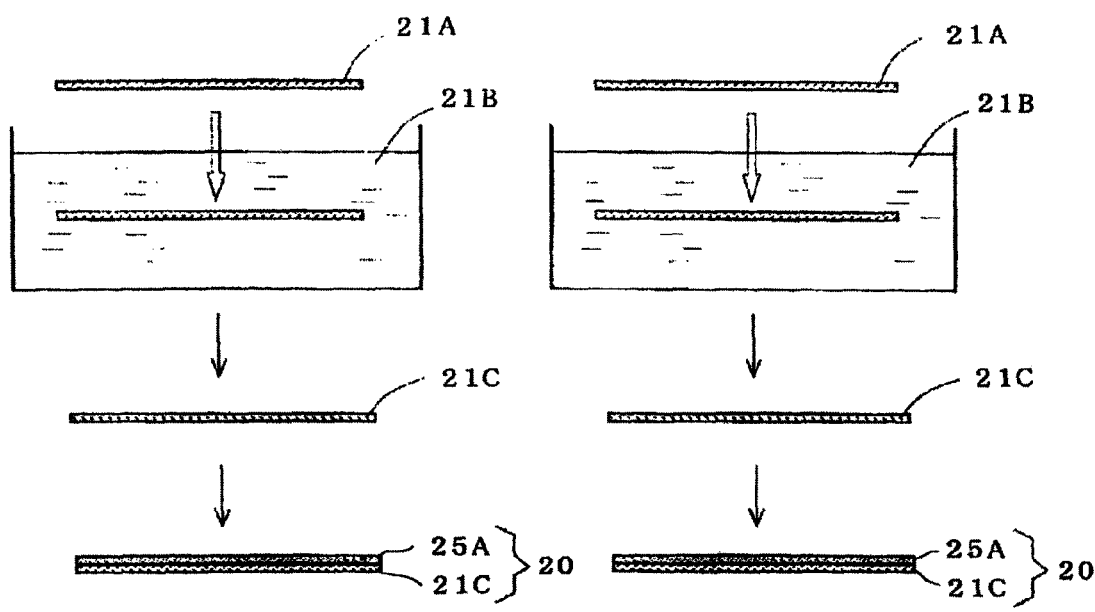
FIG. 6 is a view showing steps of a manufacturing method according to an embodiment 1-(4) of the present invention.
Figure 6:
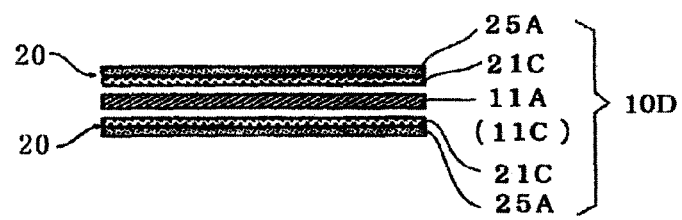
Figure 6:
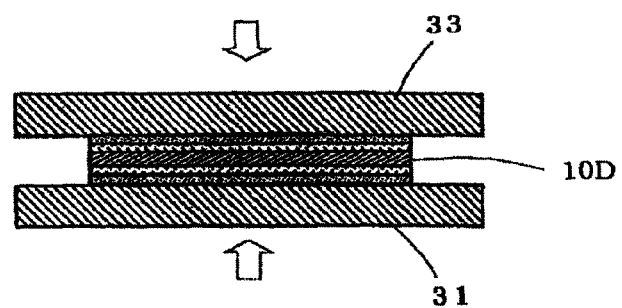

Firstly, in an impregnating step as shown in FIG. 6(6-1), two sheets of fiber fabrics 21A are impregnated with the reinforcing material thermosetting resin 21B, thereby obtaining two sheets of impregnated fiber fabrics 21C. Then, the porous sheet 25A is laminated on each of two sheets of impregnated fiber fabrics 21C. To remove a solvent contained in the reinforcing material thermosetting resin 21B, the reinforcing material thermosetting resin 21B is dried at a temperature which does not cause a curing thereof, thereby forming two sheets of semi-cured prepregs 20. The semi-cured prepregs 20 haves the fiber fabric 21A and the porous sheet 25A bonded on each other in a certain degree of strength, and thus handling thereof is easy. Alternatively, the fiber fabric 21A may be laminated on the porous sheet 25A and then the thermosetting resin 21B may be applied on the fiber fabric 21A by an application sprayer or an application roller, thereby forming the impregnated carbon fiber fabric 21C and at the same time creating the prepreg 20. The prepreg 20 may be formed by cutting a long prepreg made of the fiber fabric and the porous sheet each having a long length.

In addition to the fiber fabric 21A, the core material member 21 may be also impregnated with the core material thermosetting resin 11B, thereby forming the impregnated core material member 11C. In this case, if the reinforcing material thermosetting resin 21B and the core material thermosetting resin 11B are the same material, this is preferable in that adhesion between the core material 11 and the fiber reinforcing material 21 can be enhanced.

In the impregnating step, impregnation of the core material thermosetting resin 11B into the core material 11A and/or impregnation of the reinforcing material thermosetting resin 21B into the fiber fabric 21A are preferably performed so that the resin ratio R defined by Equation (B1) above is 50% to 80%, particularly 55% to 70%.

Also, the weight of the core material thermosetting resin 11B impregnated into the core material member 11A and/or the weight of the reinforcing material thermosetting resin 21B impregnated into the fiber fabric 11A is a value equal to Wb (=a total weight of the core material member (thermosetting resin foam), the fiber fabric (carbon fiber fabric) and the porous sheet after impregnation of the thermosetting resin)–Wa (=a total weight of the core material member (thermosetting resin foam), the fiber fabric (carbon fiber fabric) and the porous sheet before impregnation of the thermosetting resin) in Equation (B1) of the resin ratio. If the thermosetting resins dissolved in a solvent are used, the weight after impregnation of the thermosetting resins in Equation (B1) of the resin ratio is the weight after removing the solvent by drying after impregnation.

As materials used for the core material member 11A, the fiber fabric 21A, the porous sheet 25A, the core material thermosetting resin 11B and the reinforcing material thermosetting resin 21B, the same material as those in the foregoing embodiments can be used.

Then, in a laminating step as shown in FIG. 6(6-2), two sheets of prepregs 20 are respectively laminated on both surfaces of the core material member 21A, thereby forming a laminate 10D. In this time, each of the prepregs 20 is laminated on the core material member 11A, so that the impregnated fiber fabric 21C is contacted with the core material member 11A.

Although two sheets of prepregs 20 and the core material member 11A are spaced away from each other in FIG. 6(6-2) for illustrative purpose, the prepregs 20 and the core material member 11A are actually laminated without being spaced away from each other. If the prepregs 20 and the core material member 11A are laminated in molds 31 and 32 used in a compressing and heating step as described below, this is preferable in that disposing the laminate 10D in the molds can be omitted from the laminating step.

Then, in a compressing and heating step as shown in FIG. 6(6-3), the laminate 10D is compressed and heated. Thus, the fiber-reinforced molded product, in which the surface material 25, the fiber reinforcing material 21, the core material 11, and the fiber reinforcing material 21 and the surface material are laminated in this order from bottom, can be obtained.

For example, the compressing and heating step can be preformed by disposing the laminate 10D between the lower mold 31 and the upper mold 33 as shown, approaching the lower mold 31 and the upper mold 33 toward each other until a distance spaced therebetween becomes a predetermined spacing, and heating the laminate 10D by the lower mold 31 and the upper mold 33. The compression is preferably adjusted such that the compression rate C defined by Equation (A1) becomes 200 to 5000%, preferably 1000 to 2600%, and also such that the laminate 10D has a thickness of 0.3 to 2.0 mm.

Also, the compression rate can be freely set by adjusting the distance spaced between the lower mold 31 and the upper mold 33. The distance spaced between the lower mold 31 and the upper mold 33 can be easily adjusted by disposing an adjusting spacer between the lower mold 31 and the upper mold 33.

In the compressing and heating step, the reinforcing material thermosetting resin 21B is oozed out of the impregnated fiber fabrics 21C to the core material member 11A and the porous sheet 25 by compressing the laminate 10D. By heating the laminate 10D in a compressed state, the core material member 10A, the fiber fabrics 21A and the porous sheet 25 are integrated by curing of the reinforcing material thermosetting resin 21B.

In this way, because the surface material 25 is formed by impregnating the thermosetting resin 21B into the porous sheet 25A having open cells, the number of cells being 8 to 80 cells/25 mm by capillary action and then curing the thermosetting resin 21B, the thermosetting resins 11B and 21B can easily ooze out to the surface through open cells. The thermosetting resins 11B and 21B oozed out to the surface of the surface material 25 forms a smooth surface. As a result, the surface roughness of the surface material 25 is made to be 30 µm or less, thereby achieving the fiber-reinforced molded product having a reduced surface roughness and a good appearance. Also, because the smooth surface is formed of the thermosetting resins 11B and 21B oozed out of the porous sheet 21A, the smooth surface is integrated with the fiber-reinforced molded product, thereby preventing the surface from being peeled off together with the coating film 27. In addition, the thermosetting resins 11B and 21B have a high adhesion to the coating film 27, thereby achieving a good coating film adhesion.

Also, when the resin ratio R and the compression rate C are set to the predetermined ranges as described above, the fiber-reinforced molded product, which has a light weight and a high stiffness, can be provided. In this time, to achieve a high compression rate, a resin foam is preferably used as the core material member 11A.

When a core material member having open cells is used as the core material member 11A, the thermosetting resins 11B and 21B are adhered on an open cell structure of the core material member 11A, so that the thermosetting resins 11B and 21B are uniformly dispersed in the core material member 11A. In this state, by curing the thermosetting resins 11B and 21B, the thermosetting resins 11B and 21B can be densely filled in the core material member 11A, thereby obtaining the fiber-reinforced molded product in which the bending strength and the adhesive strength between the core material and the fiber reinforcing material are enhanced.

Also, when the compression rate C and the resin ratio R defined by Equations (A1) and (B1) are respectively set to ranges of 200 to 5000% and 50 to 80%, sizes of micro pores contained in the fiber-reinforced molded product can be reduced. In addition, when the compression rate C and the resin ratio R are set to the predetermined ranges and also a resin foam is used as the core material member 11A, uniformity of foam resin strands of the resin foam dispersed in the thermosetting resins 11B and 21B can be enhanced, so that the strength of the fiber-reinforced molded product can be uniformed. In other words, portions of the fiber reinforced molded product which are weak in strength are removed. In this case, when the fiber-reinforced molded product is manufactured by curing the resin foam in a compressed state, distances between strands of the resin foam become smaller than distances between strands before compression, and the skeletons of the resin foam are also flattened in a direction of the thickness of the fiber-reinforced molded product.

As described above, according to the manufacturing method of the embodiment 1-(4), the fiber-reinforced molded product having porous sheets 25 respectively disposed on both surfaces of the laminate 10D can be easily manufactured, and thus the method is suitable for a fiber-reinforced molded product having both surfaces thereof used as design surfaces.

<Modified Example>

Although the prepregs 20 are laminated on the core material member 11A to contact the impregnated fiber fabrics 21C with the core material member 11A by the laminating step in the foregoing description with respect to the manufacturing method according to the embodiment 1-(4), the present invention is not limited in this regard.

Figure 7:
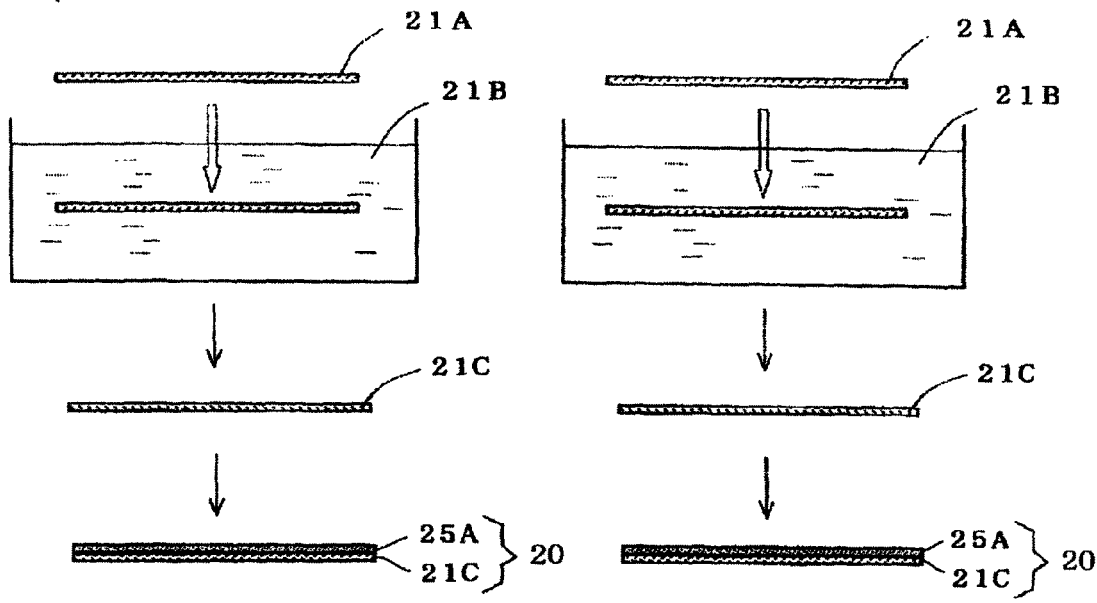
FIG. 7 is a view showing steps of a manufacturing method according to a modified example of the embodiment 1-(4) of the present invention.
Figure 7:
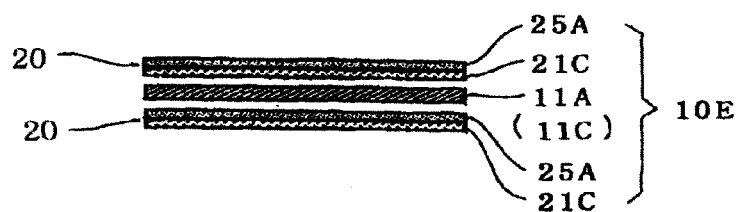
Figure 7:
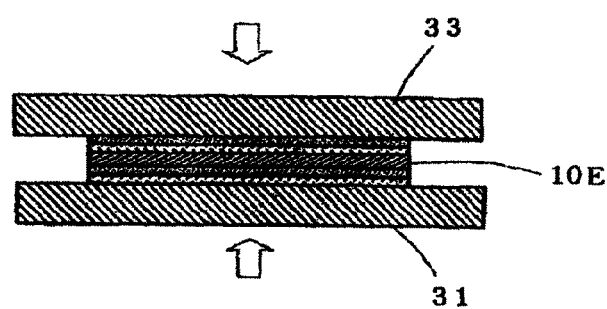
Figure 8:
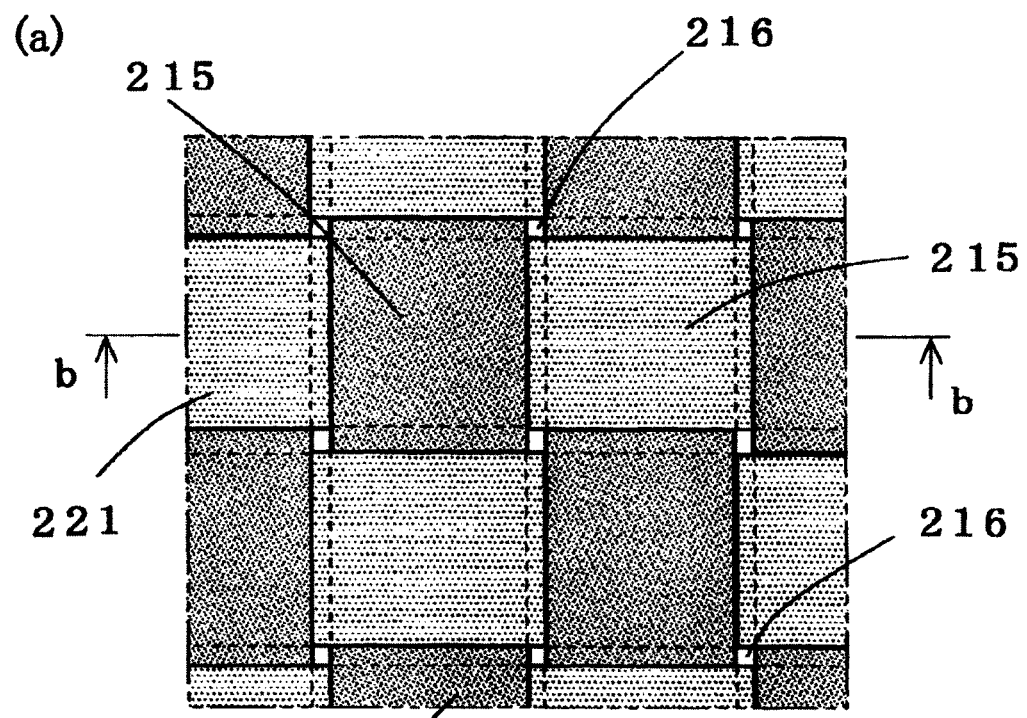
FIG. 8($a$) is a plan view showing a fiber fabric and FIG. 8($b$) is a cross-sectional view thereof.
Figure 8:
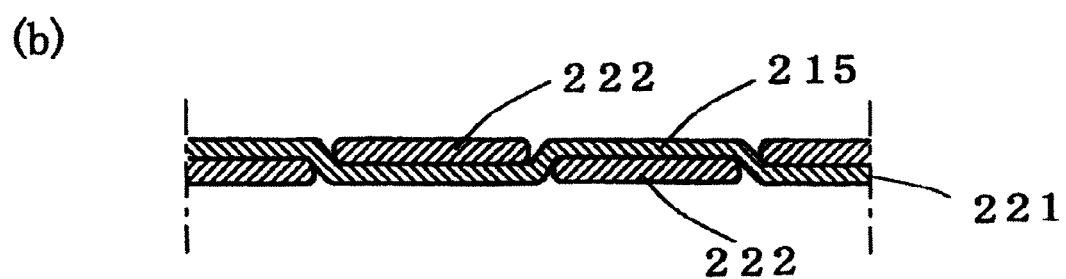

As shown in the modified example of FIG. 7, the prepregs 20 may be respectively laminated on both surfaces of the core material member 11A so that one prepreg 20 may be disposed to contact the impregnated fiber fabric 20C with the core material member 11A but the other prepreg 20 may be disposed to contact the porous sheet 25A with the core material member 11A, thereby forming a laminate 10E. Thus, it can be also said that the fiber-reinforced molded product according to this modified example is constituted of two layers of core material members (layers of core material resin foams) including the core material member 11A and the porous sheet 25A. In this way, the fiber-reinforced molded product may include the core material 11 formed of several sheets of core material members (core material resin foams).

The method for manufacturing a fiber-reinforced molded product according to the modified example is suitable for a fiber-reinforced molded product of which only one surface is used as a design surface. Also, the prepregs 20 and the impregnated carbon fiber fabric 21C don't need to be separately prepared, thereby reducing manufacturing costs. In addition, because one surface of the fiber-reinforced molded product is covered with the fiber reinforcing material, the fiber-reinforced molded product having a desired bending stiffness.

As described in each of the foregoing embodiments, in the impregnating step, at least one of the core material member 11A and the fiber fabric 21A is impregnated with the thermosetting resins 11B and 21B but the porous sheet 25A is not impregnated with the thermosetting resins 11B and 21B, and in the subsequent compressing and heating step, the porous sheet 25A is impregnated with the thermosetting resin 11A and 21B for the first time. Therefore, the porous sheet 25A can be laminated without sagging in the laminating step, thereby preventing wrinkles from being created.

Also, as shown in FIG. 2, when the surface of the surface material 25 is provided with a coating film 27, a coating step is performed after the compressing and heating step in each of the foregoing embodiments, so that the coating film 27 is formed on the surface of the surface material 25. In the coating step, the surface of the surface material 25 is coated by spraying, coater processing, dipping and the like and then dried, thereby forming the coating film 27 on the surface of the surface material. The coating materials are not particularly limited, but examples thereof include urethane-based, acrylic-based, polyester-based, acetic acid-based coatings and the like. In addition, the coating is performed to obtain a predetermined film thickness, for example, a film thickness of 5 to 40 µm.

According to one aspect of the present invention, there is provided a fiber-reinforced molded product including: a core material; a fiber reinforcing material laminated on at least one surface of the core material; and a surface material laminated on the fiber reinforcing material The core material, the fiber reinforcing material and the surface material are integrated. The fiber reinforcing material includes a fiber fabric and a thermosetting resin impregnated into the fiber fabric and cured. The surface material includes a porous sheet having open cells, the number of cells being 8 to 80 cells/25 mm, and a thermosetting resin impregnated into the porous sheet and cured. The surface material has a surface roughness Rz of 30 µm or less.

According to the fiber-reinforced molded product of the present invention described above, because the thermosetting resin can easily ooze out to the surface of the surface material through open cells of the surface material, the thermosetting resin oozed out to the surface of the surface material forms a smooth surface. As a result, the surface roughness of the surface material is made to be 30 μm or less, thereby obtaining the fiber-reinforced molded product having a reduced surface roughness and a good appearance.

Also, because the most of the smooth surface is formed of the thermosetting resin oozed out of the porous sheet, the smooth surface is integrated with the fiber-reinforced molded product, thereby preventing the surface from being peeled off together with the coating film. In addition, the thermosetting resin has a high adhesion to a coating film, thereby achieving a good coating film adhesion.

Also, according to another aspect of the present invention, there is provided a method for manufacturing a fiber-reinforced molded product. The fiber-reinforced molded product includes: a core material including a core material member; a fiber reinforcing material including a fiber fabric and laminated on at least one surface of the core material; and a surface material including a porous sheet and laminated on the fiber reinforcing material. The method including the steps of: impregnating at least one of the core material member and the fiber fabric with a thermosetting resin; laminating the fiber fabric and the porous sheet in this order on at least one surface of the core material member, the porous sheet having open cells, the number of cells being 8 to 80 cells/25 mm, and a thickness of 0.4 to 3.0 mm; and compressing and heating the core material member, the fiber fabric and the porous sheet, thereby impregnating the core material member, the fiber fabric and the porous sheet with the thermosetting resin, curing the thermosetting resin, and integrating the core material member, the fiber fabric and the porous sheet.

According to the method for manufacturing a fiber-reinforced molded product of the present invention described above, a fiber-reinforced molded product having an excellent appearance as described above can be easily obtained.

According to a further aspect of the present invention, there is provided a fiber-reinforced molded product including: a core material including a core material member having open cells; a fiber reinforcing material including a fiber fabric and laminated on each surfaces of the core material; and a surface material including a porous sheet and laminated on the fiber reinforcing material. The core material, the fiber reinforcing materials and the surface materials are integrated with each other by a thermosetting resin. The core material is formed by impregnating the core material member with the thermosetting resin and by curing the thermosetting resin in a state that the core material member is compressed, and has a compression rate C, defined by Equation (A1) below, of 200 to 5000%. The thermosetting resin has a resin ratio R, defined by Equation (B1) below, of 50 to 80%. The fiber-reinforced molded product has a flexural modulus of 30 GPa or more.

$$C=(Tb-Ta)/Ta \times 100 \quad (A1)$$

(Ta: a thickness of the core material member after compression, Tb: a thickness of the core material member before compression, C: a compression rate)

$$R=(Wb-Wa)/Wb \times 100 \quad (B1)$$

(Wa: a total weight of the core material member, the fiber fabric and the porous sheet, Wb: a total weight of the core material member, the fiber fabric and the porous sheet after impregnation of the thermosetting resin, and R: a resin ratio)

In the fiber-reinforced molded product described above, the porous sheet may be made of an urethane resin foam from which cell membranes are removed.

In the fiber-reinforced molded product described above, the core material member may be made of an urethane resin foam or a melamine resin foam.

In the fiber-reinforced molded product described above, the core material member may be impregnated with the thermosetting resin selected from a group consisting of an epoxy resin, a phenolic resin, and a mixture of an epoxy resin and a phenolic resin.

In the fiber-reinforced molded product described above, the fiber reinforcing material may be impregnated with the thermosetting resin selected from a group consisting of an epoxy resin, a phenolic resin, and a mixture of an epoxy resin and a phenolic resin.

In the fiber-reinforced molded product described above, the core material member and the fiber reinforcing material may be impregnated with the thermosetting resins made of same material.

In the fiber-reinforced molded product described above, the compression rate C, defined by Equation (A1) may be 1000 to 2600%.

In the fiber-reinforced molded product described above, a percentage of a thickness of the porous sheet forming the surface material before compression to a total thickness of the core material member and the porous sheet forming the core material before compression may be 2 to 30%.

According to the fiber-reinforced molded product of the present invention described above, because the resin ratio and the compression rate are set to predetermined ranges, the fiber-reinforced molded product which has a lightweight and a high stiffness, can be provided. In addition, the thermosetting resin is adhered on an open cell structure of the core material member, so that the thermosetting resin is uniformly dispersed in the core material member. In this state, by curing the thermosetting resin, the thermosetting resin can be densely filled in the core material member, thereby obtaining the fiber-reinforced molded product in which the bending strength and the adhesive strength between the core material and the fiber reinforcing material are enhanced.

Also, according to a further aspect of the present invention, there is provided a method for manufacturing a fiber-reinforced molded product. The fiber-reinforced molded product includes: a core material including a core material member having open cells; a fiber reinforcing material including a fiber fabric and laminated on both surfaces of the core material; and a surface material including a porous sheet having open cells and laminated on at least one surface of the fiber reinforcing materials. The method includes the steps of: impregnating at least one of the core material member and the fiber fabric with a thermosetting resins; laminating the fiber fabric on each surface of the core material member and laminating the porous sheet on at least one surface of the laminated fiber fabrics; and compressing and heating the core material member, the fiber fabrics and the porous sheet, thereby impregnating the core material member, the fiber fabrics and the porous sheet with the thermosetting resin, curing the thermosetting resin, and integrating the core material member, the fiber fabrics and the porous sheet. The impregnation in the impregnating step of performed such that a resin ratio R, defined by Equation (B1) below, is 50 to 80%. The compression in the compressing and heating step is performed such that a compression rate C, defined by Equation (A1) below, is 200 to 5000%.

$$C=(Tb-Ta)/Ta \times 100 \quad (A1)$$

(Ta: a thickness of the core material member after compression, Tb: a thickness of the core material member before compression, C: a compression rate)

$$R=(Wb-Wa)/Wb \times 100 \tag{B1}$$

(Wa: a total weight of the core material member, the fiber fabric and the porous sheet, Wb: a total weight of the core material member, the fiber fabric and the porous sheet after impregnation of the thermosetting resin, and R: a resin ratio)

In the method for manufacturing a fiber-reinforced molded product described above, the compression rate of the core material member may be 1000 to 2600%.

In the method for manufacturing a fiber-reinforced molded product described above, the porous sheet may be made of an urethane resin foam from which cell membranes are removed.

In the method for manufacturing a fiber-reinforced molded product described above, the impregnating step of may include impregnating both of the core material member and the fiber fabric with the thermosetting resin made of same material.

In the method for manufacturing a fiber-reinforced molded product described above, the laminating step may include: producing two sheets of prepregs, each having the fiber fabric impregnated with the thermosetting resin and the porous sheet laminated on the fiber fabric; and laminating the prepregs on both surfaces of the core material member respectively such that the fiber fabric contacts the core material member.

In the method for manufacturing a fiber-reinforced molded product described above, the laminating step may include: producing two sheets of prepregs, each having the fiber fabric impregnated with the thermosetting resin and the porous sheet laminated on the fiber fabric; and laminating the prepregs on both surfaces of the core material member respectively such that the fiber fabric of one of the prepregs contacts the core material member and such that the porous sheet of the other prepreg contacts the core material member In the method for manufacturing a fiber-reinforced molded product described above, a percentage of a thickness of the porous sheet forming the surface material before compression to a total thickness of the core material member and the porous sheet forming the core material before compression may be 2 to 30%.

According to the method for manufacturing a fiber-reinforced molded product of the present invention described above, a fiber-reinforced molded product, in which the stiffness is high and also the bending strength and the adhesive strength between the core material and the fiber reinforcing material are enhanced as described above, can be easily obtained.

EXAMPLES

Fiber-reinforced molded products of Examples 1-1 to 1-9 were produced according to the manufacturing method of the foregoing embodiment 1-(3) of the present invention and fiber-reinforced molded products of Examples 1-10 and 1-11 were produced according to the manufacturing method of the foregoing embodiment 1-(4) of the present invention and the modified example thereof, and then these fiber-reinforced molded products were compared with fiber-reinforced molded products of Comparative Examples 1-1 to 1-3.

Example 1-1

A phenolic resin (a mixture of PAPS-4, a trade name, produced by Asahi Organic Chemicals Industry Co. Ltd., and Hexamethylenetetramine, a trade name, produced by Asahi Organic Chemicals Industry Co. Ltd. at a ratio of 100:12) as the thermosetting resin was dissolved in methanol at a concentration of 30 wt %. In this phenolic resin solution, a plain woven carbon fiber fabric (W-3101, a trade name, produced by TOHO TENAX Co. Ltd. and having a basis weight of 200 g/m$^2$) as the fiber fabric was immersed. After taking out of the solution, the carbon fiber fabric was air-dried for 2 hours at room temperature of 25° C. and then further dried for 1 hour under an atmosphere of 60° C., thereby forming two sheets of impregnated fiber fabrics. The carbon fiber fabric was used that has been cut into a plane size of 200×300 mm (a weight of 12 g per sheet). The impregnated carbon fiber fabrics after drying had a weight of 28 g per sheet.

Also, a melamine resin foam (Basotect V3012, a trade name, produced by BASF and having a density of 9 kg/m$^3$) having open cells and cut to a thickness of 10 mm and a plane size of 200×300 mm (a weight of 5.4 g) as the core material member was immersed in the phenolic resin solution in the same manner as in the case of the fiber fabric. After taking out of the solution, the resin foam was air-dried for 2 hours at room temperature of 25° C. and then further dried for 1 hour under an atmosphere of 60° C., thereby forming the impregnated core material member. The impregnated core material thermal member after drying had a weight of 27 g. Also, a resin ratio in the whole of the fiber fabrics and the core material member was 65%.

Next, the impregnated fiber fabric, the impregnated core material member, the impregnated fiber fabric, and a porous sheet were superimposed in this order on a lower press forming mold (planar type) made of SUS, of which a surface has been previously coated with a mold release agent. By doing so, a laminate, in which the impregnated fiber fabrics were disposed on both surfaces of the impregnated core material member and the porous sheet was additionally disposed on a surface of the fiber fabric at one side of the core material member, was set on the lower press forming mold.

As the porous sheet, an urethane resin foam (MF-50, a trade name, produced by Inoac Corporation and having a bulk specific gravity of 0.03 and a cell number of 50 cells/25 mm), from which cell membranes were been removed by a dissolution treatment and which has been cut into a thickness of 0.4 mm in an uncompressed state, was used. The percentage of the thickness of the porous sheet forming the surface material to the thickness of the core material member was 4%. In addition, a porosity of the urethane resin foam used was 97.1%. The porosity was calculated by the following equation: Porosity (%)=(true specific gravity of urethane resin−bulk specific gravity(≈apparent density of urethane resin))/true specific gravity of urethane resin×100.

In the state that the laminate was set on the lower press forming mold, the laminate was pressed by the upper press forming mold (planar type) at 180° C. for 3 minutes with a surface pressure of 5 MPa, so that the laminate was compressed and heated and the phenolic resin was reacted and cured in the compressed state. In this case, heating of the laminate was performed by cast-in heaters attached on the upper and lower press forming molds.

A spacer made of SUS and having a thickness of 0.9 mm was disposed between the lower press forming mold and the upper press forming mold, so that a spacing between the lower mold and the upper mold, i.e., a compressed thickness of the laminate was adjusted. Then, the lower and upper press forming molds were cooled at room temperature, and the lower and upper molds were opened. As a result, a fiber-reinforced molded product, in which the fiber reinforcing material were laminated on both surfaces of the core material and the surface material formed of the porous sheet was additionally integrally laminated on the fiber reinforcing material at one side, was obtained. This fiber-reinforced molded product was trimmed to 170×260 mm, to produce the fiber-reinforced molded product of Example 1-1.

Example 1-2

A fiber-reinforced molded product according to Example 1-2 was produced in the same manner as in Example 1-1, except that the thickness of the porous sheet (an uncompressed thickness) in Example 1-1 was 0.6 mm. The percentage of the thickness of the porous sheet forming the surface material to the thickness of the core material member was 6%.

Example 1-3

A fiber-reinforced molded product according to Example 1-3 was produced in the same manner as in Example 1-1, except that the thickness of the porous sheet (an uncompressed thickness) in Example 1-1 was 1.0 mm. The percentage of the thickness of the porous sheet forming the surface material to the thickness of the core material member was 10%.

Example 1-4

A fiber-reinforced molded product according to Example 1-4 was produced in the same manner as in Example 1-1, except that the thickness of the porous sheet (an uncompressed thickness) in Example 1-1 was 2.0 mm. The percentage of the thickness of the porous sheet forming the surface material to the thickness of the core material member was 20%.

Example 1-5

A fiber-reinforced molded product according to Example 1-5 was produced in the same manner as in Example 1-1, except that the thickness of the porous sheet (an uncompressed thickness) in Example 1-1 was 3.0 mm. The percentage of the thickness of the porous sheet forming the surface material to the thickness of the core material member was 30%.

Example 1-6

A fiber-reinforced molded product according to Example 1-6 was produced in the same manner as in Example 1-1, except that, instead of the porous sheet in Example 1-1, an urethane resin foam (MF-80, a trade name, produced by Inoac Corporation and having a bulk specific gravity of 0.05 and a cell number of 80 cells/25 mm), from which cell membranes were been removed by a dissolution treatment and which had a porosity of 95.2% and an uncompressed thickness of 1.0 mm, was used. The percentage of the thickness of the porous sheet forming the surface material to the thickness of the core material member was 10%.

Example 1-7

A fiber-reinforced molded product according to Example 1-7 was produced in the same manner as in Example 1-1, except that, instead of the porous sheet in Example 1-1, an urethane resin foam (MF-10, a trade name, produced by Inoac Corporation and having a bulk specific gravity of 0.028 and a cell number of 10 cells/25 mm), from which cell membranes were been removed by a dissolution treatment and which had a porosity of 97.3% and an uncompressed thickness of 1.0 mm, was used. The percentage of the thickness of the porous sheet forming the surface material to the thickness of the core material member was 10%.

Example 1-8

A fiber-reinforced molded product according to Example 1-8 was produced in the same manner as in Example 1-1, except that, instead of the porous sheet in Example 1-1, an urethane resin foam (MF-8, a trade name, produced by Inoac Corporation and having a bulk specific gravity of 0.027 and a cell number of 8 cells/25 mm), from which cell membranes were been removed by a dissolution treatment and which had a porosity of 97.4% and an uncompressed thickness of 1.0 mm, was used. The percentage of the thickness of the porous sheet forming the surface material to the thickness of the core material member was 10%.

Example 1-9

A fiber-reinforced molded product according to Example 1-9 was produced in the same manner as in Example 1-1, except that, instead of the porous sheet in Example 1-1, an urethane resin foam (SP-50, a trade name, produced by Inoac Corporation and having a bulk specific gravity of 0.031 and a cell number of 50 cells/25 mm), from which cell membranes were not been removed to having cell membranes remained thereon and which had a porosity of 97.0% and an uncompressed thickness of 1.0 mm, was used. The percentage of the thickness of the porous sheet forming the surface material to the thickness of the core material member was 10%.

Example 1-10

A phenolic resin (phenolite 5010, a trade name, produced by DIC Corporation and having solids of 60%) as the reinforcing material thermosetting resin was mixed in ethanol at 50 wt %. A plain woven carbon fiber fabric (W-3101, a trade name, produced by TOHO TENAX Co. Ltd. and having a basis weight of 200 g/m$^2$) was immersed in the phenolic resin solution, and then a porous sheet (MF-50LE, a trade name, produced by Inoac Corporation and having a bulk specific gravity of 0.03 and a cell number of 50 cells/25 mm) was disposed thereon, thereby obtaining a prepreg.

As the porous sheet, an urethane resin foam, from which cell membranes were been removed by a dissolution treatment and which has been cut into a thickness of 0.7 mm in an uncompressed state, was used. In addition, a porosity of the urethane resin foam used was 97.1%. The porosity was calculated by the following equation.

Porosity (%)=(true specific gravity of urethane resin−bulk specific gravity(≈apparent density of urethane resin foam))/true specific gravity of urethane resin×100.

Meanwhile, the carbon fiber fabric was used that had a size of 380×260 mm (a weight of 19.8 g per sheet). The impregnated carbon fiber fabrics after drying had a weight of 36 g per sheet. Two sheets of prepregs obtained in this way were dried for 5 minutes under an atmosphere of 87° C.

A melamine resin foam (Basotect V3012, a trade name, produced by BASF and having a density of 9 kg/m$^3$) having open cells and cut to a thickness of 7.5 mm and a plane size of 380×260 mm (a weight of 6.0 g per sheet) as the core material member was immersed in the phenolic resin solution in the same manner as in the case of the carbon fiber fabric. After taking out of the solution, the resin foam was dried for 31 minutes under an atmosphere of 100° C., thereby forming the impregnated core material member. The impregnated core material member after drying had a weight of 67 g. Also, a resin ratio in the fiber fabric and the core material member was 64%.

Then, the prepreg, which is arranged to orient the porous sheet upward, the impregnated thermosetting resin foam, and the prepreg, which is arranged to orient the porous sheet upward, were laminated in this order on a planar-type lower press forming mold made of SUS, of which a surface has been previously coated with a mold release agent, thereby obtaining a laminate. In other words, the laminate included the fiber fabric, the porous sheet, the core material member, the fiber fabric and the porous sheet laminated in this order from bottom. This laminate was set on the lower press forming mold. The percentage of the thickness of the porous sheet forming the surface material to the total thickness of the core material member and the porous sheet forming the core material was 9%.

In the state that the laminate was set on the lower press forming mold, the laminate was pressed by the upper press forming mold (planar type) at 145° C. for 8 minutes with a surface pressure of 5 MPa, so that the laminate was compressed and heated and the phenolic resin was reacted and cured in the compressed state. In this case, heating of the laminate was performed by cast-in heaters attached on the upper and lower press forming molds.

In addition, a spacing of 1.0 mm was provided between the lower press forming mold and the upper press forming mold to adjust a compressed thickness of the laminate. Then, the lower and upper molds were opened, and as a result, a fiber-reinforced molded product, in which the fiber reinforcing materials were laminated on both surfaces of the core material and the surface material formed of the porous sheet was additionally integrally laminated on the fiber reinforcing material at one side, was obtained.

Example 1-11

Prepregs obtained in the same manner as in Example 1-10 as described above were used. However, the prepreg, which is arranged to orient the porous sheet downward, the impregnated thermosetting resin foam, and the prepreg, which is arranged to orient the porous sheet upward, were laminated in this order on a lower press forming mold made (planar-type) of SUS, of which a surface has been previously coated with a mold release agent, thereby obtaining a laminate. In other words, the laminate included the porous sheet, the fiber fabric, the core material member, the fiber fabric and the porous sheet laminated in this order from bottom. This laminate was set on the lower press forming mold. The percentage of the total thickness of the porous sheets forming the surface material to the thickness of the core material member was 19%.

In the state that the laminate was set on the lower press forming mold, the laminate was pressed by the upper press forming mold (planar type) at 145° C. for 8 minutes with a surface pressure of 5 MPa, so that the laminate was compressed and heated and the phenolic resin was reacted and cured in the compressed state. In this case, heating of the laminate was performed by cast-in heaters attached on the upper and lower press forming molds. In addition, a spacing of 1.0 mm was provided between the lower press forming mold and the upper press forming mold to adjust a compressed thickness of the laminate.

Then, the lower and upper molds were opened, and as a result, a fiber-reinforced molded product, in which the fiber reinforcing materials were laminated on both surfaces of the core material and the surface materials formed of the porous sheets were additionally integrally laminated on the fiber reinforcing materials, was obtained.

Comparative Example 1-1

A fiber-reinforced molded product according to Comparative Example 1-1 was produced in a state that the porous sheet was eliminated from the surface in Example 1-1.

Comparative Example 1-2

A fiber-reinforced molded product according to Comparative Example 1-2 was produced in the same manner as in Example 1-1, except that the thickness of the porous sheet (an uncompressed thickness) on the surface in Example 1-1 was 4.0 mm. The percentage of the thickness of the porous sheet forming the surface material to the total thickness of the core material member was 40%.

Comparative Example 1-3

A fiber-reinforced molded product according to Comparative Example 1-3 was produced in the same manner as in Example 1-1, except that, instead of the porous sheet in Example 1-1, an urethane resin foam (MF-100, a trade name, produced by Inoac Corporation and having a bulk specific gravity of 0.075 and a cell number of 100 cells/25 mm), from which cell membranes were been removed by a dissolution treatment and which had a porosity of 92.8% and an uncompressed thickness of 1.0 mm, was used.

With respect to each of Examples and Comparative Examples, a total thickness before coating, a flexural modulus (JIS K 7074-1988 Method A, a fiber direction) and a surface roughness of the surface material wars measured. The surface roughness was obtained by measuring a ten point average roughness ((RzJIS82) along a reference length of 20 mm on the surface of the surface material, using a surface roughness meter (Surfcom113A, a trade name, produced by TOKYO SEIMITSU CO., LTD.). RzJIS82 is a ten point mean roughness according to a pre-revised standard JIS B0601:1982 and is a sum of an average height of the highest peak to the fifth highest peak and an average depth of the deepest valley to the fifth deepest valley in a cross-section curve of the reference length. The measured results are shown in Table 1.

Also, with respect to each of Examples and Comparative Examples, a two-liquid curing urethane-based coating material was coated at a film thickness of 20 μm on the surface of the surface material (the surface of the fiber fabric in a case of Comparative Example 1-1) by spray coating, thereby forming a coating film. Then, a coating appearance, a surface roughness of the coated surface, and a coating adhesion were investigated.

The coating appearance means an appearance of the coating film, and, when visually observing the surface of the coating film after drying, a case that unevenness was not thoroughly observed was designated as E (Excellent), a case that unevenness was slightly observed was designated as G (Good), and a case the unevenness was clearly observed was designated as B (Bad).

The surface roughness of the coated surface was represented as an average surface roughness (μm) obtained by measuring Rz;10 points mean roughness with respect to the surface of the coating film after drying, using a surface roughness meter (Surfcom, a trade name, produced by TOKYO SEIMITSU CO., LTD.).

The coating adhesion means an adhesion of the coating film and was determine as the following. Lattice patterned crosscuts was formed in the surface of the coating film at intervals of 1 mm using a cutter to form 100 masses. A cellophane tape having a width of 25 mm and a length of 75 mm was bonded on 100 masses formed by crosscuts. Then, the cellophane tape was pulled off, and thus the number of masses, of which the coating film was not peeled off, represented the panting adhesion. The measured results are shown in Table 1.

Furthermore, Examples 1-1 to 1-11, in which the percentage of the total thickness of the porous sheets forming the surface material before compression to the total thickness of the core material member and the porous sheet forming the core material before compression was 4 to 30%, had a flexural modulus larger than that of Comparative Example 1-2 in which the percentage was 40%.

Comparative Example 1-3, in which the cell number of the porous sheet was 100 cells/25 mm, had approximately 2 to 4 times the surface roughness before and after coating and a

TABLE 1

| Items | Porous Sheet on Surface | | | | Fiber-reinforced molded product Before Coating | | | Fiber-reinforced molded product After Coating | | |
|---|---|---|---|---|---|---|---|---|---|---|
| | Thickness (mm) | Cell Membrane Removing Treatment | Number of Cells (cells/ 25 mm) | Porosity (%) | Total Thickness (mm) | Flexural Modulus (GPa) | Surface Roughness (μm) | Coating Appearance | Surface Roughness (μm) | Coating Adhesion* |
| Example 1-1 | 0.4 | Yes | 50 | 97.1 | 0.97 | 49 | 24 | G | 21 | 100/100 |
| Example 1-2 | 0.6 | Yes | 50 | 97.1 | 0.97 | 49 | 16 | E | 13 | 100/100 |
| Example 1-3 | 1 | Yes | 50 | 97.1 | 0.98 | 47 | 11 | E | 9 | 100/100 |
| Example 1-4 | 2 | Yes | 50 | 97.1 | 0.99 | 39 | 12 | E | 11 | 100/100 |
| Example 1-5 | 3 | Yes | 50 | 97.1 | 0.99 | 32 | 16 | E | 12 | 100/100 |
| Example 1-6 | 1 | Yes | 80 | 95.2 | 0.99 | 45 | 18 | E | 15 | 100/100 |
| Example 1-7 | 1 | Yes | 10 | 97.3 | 0.98 | 47 | 22 | E | 18 | 100/100 |
| Example 1-8 | 1 | Yes | 8 | 97.4 | 0.97 | 47 | 24 | G | 20 | 97/100 |
| Example 1-9 | 1 | No | 50 | 97.0 | 0.98 | 46 | 25 | G | 22 | 98/100 |
| Example 1-10 | 0.7 | Yes | 50 | 97.1 | 0.98 | 48 | 16 | E | 13 | 100/100 |
| Example 1-11 | 0.7 | Yes | 50 | 97.1 | 0.98 | 42 | 16 | E | 12 | 100/100 |
| Comparative Example 1-1 | | No Porous Sheet | | | 0.97 | 51 | 50 | B | 45 | 95/100 |
| Comparative Example 1-2 | 4 | Yes | 50 | 97.1 | 1.01 | 28 | 46 | B | 40 | 94/100 |
| Comparative Example 1-3 | 1 | Yes | 100 | 92.8 | 1.00 | 44 | 40 | B | 36 | 96/100 |

*A denominator is 100 masses and a numerator is the number of masses which were not peeled off.

As compared to Comparative Example 1-1 in which the surface is not provided with a porous sheet, Examples 1-1 to 1-9 in which the surface is provided with the porous sheet (surface material) was smaller in both of the surface roughness before coating and the surface roughness after coating and also had a superior coating appearance and a superior coating adhesion, and thus the coating film was not easily to be peeled off. In particular, when Example 1-1 and Comparative Example 1-1, which are different only whether the porous sheet is present or not, were compared to each other, Comparative Example 1-1, which did not have a porous sheet, had twice or more the surface roughness before coating and the surface roughness after coating in Example 1-1, and also was significantly inferior in the coating appearance and the coating adhesion than in Example 1-1.

Also, when Example 1-3 in which cell membranes was removed from the porous sheet is compared to Example 1-9 in which cell membranes was not removed from the porous sheet, Example 1-3 in which cell membranes was removed had half or less the surface roughness before and after coating in Example 1-9 and had a very small unevenness. Also, Example 1-3 was superior in the coating appearance and the coating adhesion than in Example 1-9.

In addition, Comparative Example 1-2 identical to Example 1-1, except that a thickness (an uncompressed thickness) of the porous sheet was changed from 0.4 mm in Example 1-1 to 4.0 mm, had half the flexural modulus and had approximately twice the surface roughness before and after coating and a very large unevenness, as compared to Example 1-1. Also, Comparative Example 1-2 was inferior in the coating appearance and the coating adhesion than in Example 1-1.

very large unevenness, as compared to Example 1-3 (the cell number of 50 cells/25 mm), Example 1-6 (the cell number of 80 cells/25 mm), Example 1-7 (the cell number of 10 cells/25 mm), and Example 1-8 (the cell number of 8 cells/25 mm) identical to Comparative Example 1-3 except for the cell number. Also, Comparative Example 1-3 was inferior in the coating appearance and the coating adhesion than in Examples 1-3, 1-6, 1-7, and 1-8.

In addition, a significant difference between Examples 1-1 to 1-9 and Examples 1-10 and 1-11 was not found. Accordingly, it was found that a fiber-reinforced molded product which is excellent in the coating appearance and the coating adhesion can be obtained by either of the manufacturing method in which a thermosetting resin is impregnated into at least one of the core material member and the fiber fabric and then each member is laminated on top of another, or the manufacturing method in which prepregs are produced from the fiber fabric and the porous sheet and then the prepreg are laminated on the core material member.

Thus, the article according to examples of the present invention has a thinned thickness and a high stiffness, and also has a good appearance after coating, thereby eliminating a possibility that the coating film may be peeled off. Therefore, the article is suitable for a housing of portable devices, such as laptop computers. In addition, depending on a use of the fiber-reinforced molded product, the fiber reinforcing material and the surface material are provided on only one side of the core material.

In this case, to obtain a thinned fiber-reinforced molded product, it is necessary to thin a thickness of the core material resin foam which contains the thermosetting resin and serves as a spacer for adjusting a thickness of the core material. However, when the core material resin foam is used as the core material as it is without being compressed, there are the following two problems:

a. It is difficult to thinly and uniformly slice a resin foam used as the core material resin foam. In particular, when the resin foam as the core material resin foam is thinly sliced, the thickness thereof tends to be non-uniformed.

b. Considering cut surfaces of the sliced resin foam as the core material resin foam in an uncompressed state, a cross section which has cell skeletons of the foam in a longitudinal direction and a cross section which does not have cell skeletons can be concurrently present in the sliced resin foam. Therefore, when the resin foam is used to form a fiber-reinforced molded product without being compressed, a resin ratio of thermosetting resins is different for each of the cut surfaces, and an overall flexural modulus is decreased due to an influence of a weak cut surface.

Therefore, according to the fiber-reinforced molded product of the present invention, the core material resin foam as the core material resin foam is processed in a thick state and then compressed, thereby obtaining the following effects:

Non-uniformity in thickness of the core material resin foam is reduced depending on the compression rate.

Cell skeletons randomly stacked in the core material resin foam are folded by compression, and thus non-uniformity in resin ratio in each of cut surfaces is decreased.

A thick core material resin foam is easily impregnated with a thermosetting resin.

Accordingly, in fiber-reinforced molded products according to examples as described below, core material resin foams were used in a thick state and were compressed in a state that a thermosetting resin is impregnated therein, and the compression rate and the impregnation amount are set in specific ranges. This will described below in detail.

A fiber-reinforced molded product of Example 2-8 was produced according to the manufacturing method of the foregoing embodiment 1-(1) of the present invention, a fiber-reinforced molded product of Example 2-9 was produced according to the manufacturing method of the foregoing embodiment 1-(2) of the present invention, fiber-reinforced molded products of Examples 2-1 to 2-7 and 2-10 to 2-14 were produced according to the manufacturing method of the foregoing embodiment 1-(3) of the present invention, fiber-reinforced molded products of Example 2-15 and 2-16 were produced according to the manufacturing method of the foregoing embodiment 1-(4) of the present invention, and then these fiber-reinforced molded products were compared with fiber-reinforced molded products of Comparative Examples 2-1 to 2-10.

Example 2-1

A phenolic resin (a mixture of PAPS-4, a trade name, produced by Asahi Organic Chemicals Industry Co. Ltd., and Hexamethylenetetramine, a trade name, produced by Asahi Organic Chemicals Industry Co. Ltd. at a ratio of 100:12) as the thermosetting resin was dissolved in methanol at a concentration of 30 wt %. In this phenolic resin solution, a plain woven fiber fabric (carbon fiber fabric, W-3101, a trade name, produced by TOHO TENAX Co. Ltd. and having a basis weight of 200 g/m$^2$) as the fiber fabric was immersed. After taking out of the solution, the fiber fabric was air-dried for 2 hours at room temperature of 25° C. and then further dried for 1 hour under an atmosphere of 60° C., thereby forming two sheets of impregnated fiber fabrics. The fiber fabric was used that has been cut into a plane size of 200×300 mm (a weight of 12 g per sheet). The impregnated fiber fabrics after drying had a weight of 28 g per sheet.

Also, a melamine resin foam (Basotect V3012, a trade name, produced by BASF and having a density of 9 kg/m$^3$) having open cells and cut to a thickness of 10 mm and a plane size of 200×300 mm (a weight of 5.4 g) as the core material resin foam was immersed in the phenolic resin solution in the same manner as in the case of the fiber fabric. After taking out of the solution, the resin foam was air-dried for 2 hours at room temperature of 25° C. and then further dried for 1 hour under an atmosphere of 60° C., thereby forming the impregnated core material resin foam. The impregnated core material resin foam after drying had a weight of 27 g. Also, a resin ratio (a value calculated by Equation (B1) of the resin ratio) in the whole of the fiber fabrics and the core material resin foam was 65%.

Next, the impregnated fiber fabric, the impregnated core material resin foam, the impregnated fiber fabric, and a porous sheet were superimposed in this order on a lower press forming mold (planar type) made of SUS, of which a surface has been previously coated with a mold release agent. By doing so, a laminate, in which the impregnated fiber fabrics were disposed on both surfaces of the impregnated core material resin foam and the porous sheet was additionally disposed on a surface of the fiber fabric at one side of the core material resin foam, was set on the lower press forming mold.

As the porous sheet, an urethane resin foam (MF-50, a trade name, produced by Inoac Corporation and having a bulk specific gravity of 0.03 and a cell number of 50 cells/25 mm), from which cell membranes were been removed by a dissolution treatment and which has been cut into a thickness of 0.4 mm in an uncompressed state, was used. The percentage of the thickness of the porous sheet forming the surface material to the thickness of the core material resin foam was 4%. In addition, a porosity of the urethane resin foam used was 97.1%. The porosity was calculated by the following equation:

Porosity (%)=(true specific gravity of urethane resin−bulk specific gravity(≈apparent density of urethane resin foam))/true specific gravity of urethane resin×100.

In the state in which the laminate was set on the lower press forming mold, the laminate was pressed by the upper press forming mold (planar type) at 180° C. for 3 minutes with a surface pressure of 5 MPa, so that the laminate was compressed and heated and the phenolic resin was reacted and cured in the compressed state. In this case, heating of the laminate was performed by cast-in heaters attached on the upper and lower press forming molds. A spacer made of SUS and having a thickness of 0.9 mm was disposed between the lower press forming mold and the upper press forming mold, so that a distance between the lower mold and the upper mold, i.e., a compressed thickness of the laminate was adjusted.

Then, the lower and upper press forming molds were cooled at room temperature, and the lower and upper molds were opened. As a result, a fiber-reinforced molded product, which is integrally formed by laminating the fiber reinforcing material on both surfaces of the core material and additionally laminating the surface material formed of the porous sheet on the fiber reinforcing material at one side, was obtained. This fiber-reinforced molded product was trimmed to 170×260 mm, to produce the fiber-reinforced molded product of Example 2-1.

The fiber-reinforced molded product of Example 2-1 was measured with respect to a specific gravity and an entire thickness thereof and a thickness of the core material. The specific gravity was 1.30, the entire thickness was 0.89 mm, and the thickness of the core material was 0.43 mm. The compression rate of the thermosetting resin foam constituting the core material was 2225%, as calculated according to Equation of the compression rate using the thickness (10 mm) of the core material resin foam before compression and the thickness (0.43 mm) of the core material. Also, to evaluate stiffness of the fiber-reinforced molded product of Example 2-1, a flexural modulus (JIS K 7074-1988 Method A) thereof was measured. As a result, the flexural modulus was 50 GPa (along a fiber direction).

Example 2-2

A fiber-reinforced molded product was obtained in the same manner as in Example 2-1, except that the thickness of the core material resin foam was 5 mm and the impregnation amount of the thermosetting resin into the core material resin foam was adjusted such that the resin ratio (a value calculated by Equation (B1) of the resin ratio) in the whole of the fiber fabrics and the core material resin foam was 65%. The percentage of the thickness of the porous sheet forming the surface material to the thickness of the core material resin foam was 8%.

The fiber-reinforced molded product of Example 2-2 was measured with respect to a specific gravity and an entire thickness thereof and a thickness of the core material. The specific gravity was 1.29, the entire thickness was 0.9 mm, and the thickness of the core material was 0.43 mm. The compression rate of the core material resin foam was 1062%, as calculated according to Equation of the compression rate using the thickness (5 mm) of the core material resin foam before compression and the thickness (0.43 mm) of the core material. Also, to evaluate stiffness of the fiber-reinforced molded product of Example 2-2, a flexural modulus (JIS K 7074-1988 Method A) thereof was measured. As a result, the flexural modulus was 49 GPa (along a fiber direction).

Example 2-3

A fiber-reinforced molded product was obtained in the same manner as in Example 2-1, except that the thickness of the core material resin foam was 11.5 mm and the impregnation amount of the thermosetting resin into the core material resin foam was adjusted such that the resin ratio (a value calculated by Equation (B1) of the resin ratio) in the whole of the fiber fabrics and the core material resin foam was 65%. The percentage of the thickness of the porous sheet forming the surface material to the thickness of the core material resin foam was 3%.

The fiber-reinforced molded product of Example 2-3 was measured with respect to a specific gravity and an entire thickness thereof and a thickness of the core material. The specific gravity was 1.32, the entire thickness was 0.9 mm, and the thickness of the core material was 0.44 mm. The compression rate of the core material resin foam was 2513%, as calculated according to Equation of the compression rate using the thickness (11.5 mm) of the core material resin foam before compression and the thickness (0.44 mm) of the core material. Also, to evaluate stiffness of the fiber-reinforced molded product of Example 2-3, a flexural modulus (JIS K 7074-1988 Method A) thereof was measured. As a result, the flexural modulus was 51 GPa (along a fiber direction).

Example 2-4

A fiber-reinforced molded product was obtained in the same manner as in Example 2-1, except that the thickness of the core material resin foam was 1.4 mm and the impregnation amount of the thermosetting resin into the core material resin foam was adjusted such that the resin ratio (a value calculated by Equation (B1) of the resin ratio) in the whole of the fiber fabrics and the core material resin foam was 65%. The percentage of the thickness of the porous sheet forming the surface material to the thickness of the core material resin foam was 29%.

The fiber-reinforced molded product of Example 2-4 was measured with respect to a specific gravity and an entire thickness thereof and a thickness of the core material. The specific gravity was 1.28, the entire thickness was 0.9 mm, and the thickness of the core material was 0.43 mm. The compression rate of the core material resin foam was 225%, as calculated according to Equation of the compression rate using the thickness (1.4 mm) of the core material resin foam before compression and the thickness (0.43 mm) of the core material. Also, to evaluate stiffness of the fiber-reinforced molded product of Example 2-4, a flexural modulus (JIS K 7074-1988 Method A) thereof was measured. As a result, the flexural modulus was 46 GPa (along a fiber direction).

Example 2-5

A fiber-reinforced molded product was obtained in the same manner as in Example 2-1, except that the thickness of the core material resin foam was 22 mm and the impregnation amount of the thermosetting resin into the core material resin foam was adjusted such that the resin ratio (a value calculated by Equation (B1) of the resin ratio) in the whole of the fiber fabrics and the core material resin foam was 65%. The percentage of the thickness of the porous sheet forming the surface material to the thickness of the core material resin foam was 2%.

The fiber-reinforced molded product of Example 2-5 was measured with respect to a specific gravity and an entire thickness thereof and a thickness of the core material. The specific gravity was 1.35, the entire thickness was 0.9 mm, and the thickness of the core material was 0.44 mm. The compression rate of the core material resin foam was 4900%, as calculated according to Equation of the compression rate using the thickness (22 mm) of the core material resin foam before compression and the thickness (0.44 mm) of the core material. Also, to evaluate stiffness of the fiber-reinforced molded product of Example 2-5, a flexural modulus (JIS K 7074-1988 Method A) thereof was measured. As a result, the flexural modulus was 51 GPa (along a fiber direction).

Example 2-6

A fiber-reinforced molded product was obtained in the same manner as in Example 2-1, except that the impregnated fiber fabrics after drying had a weight of 35 g per sheet, the impregnated core material resin foam after drying had a weight of 45 g, and the resin ratio (a value calculated by Equation (B1) of the resin ratio) in the whole of the fiber fabrics and the core material resin foam was 74%. The percentage of the thickness of the porous sheet forming the surface material to the thickness of the core material resin foam was 4%.

The fiber-reinforced molded product of Example 2-6 was measured with respect to a specific gravity and an entire thickness thereof and a thickness of the core material. The specific gravity was 1.45, the entire thickness was 1.0 mm, and the thickness of the core material was 0.52 mm. The compression rate of the core material resin foam was 1823%, as calculated according to Equation of the compression rate using the thickness (10 mm) of the core material resin foam before compression and the thickness (0.52 mm) of the core material. Also, to evaluate stiffness of the fiber-reinforced molded product of Example 2-6, a flexural modulus (JIS K 7074-1988 Method A) thereof was measured. As a result, the flexural modulus was 55 GPa (along a fiber direction).

Example 2-7

A fiber-reinforced molded product was obtained in the same manner as in Example 2-1, except that the impregnated fiber fabrics after drying had a weight of 22 g per sheet, the impregnated core material resin foam after drying had a weight of 16 g, and the resin ratio (a value calculated by Equation (B1) of the resin ratio) in the whole of the fiber fabrics and the core material resin foam was 51%. The percentage of the thickness of the porous sheet forming the surface material to the thickness of the core material resin foam was 4%.

The fiber-reinforced molded product of Example 2-7 was measured with respect to a specific gravity and an entire thickness thereof and a thickness of the core material. The specific gravity was 1.30, the entire thickness was 0.9 mm, and the thickness of the core material was 0.43 mm. The compression rate of the core material resin foam was 2225%, as calculated according to Equation of the compression rate using the thickness (10 mm) of the core material resin foam before compression and the thickness (0.43 mm) of the core material. Also, to evaluate stiffness of the fiber-reinforced molded product of Example 2-7, a flexural modulus (JIS K 7074-1988 Method A) thereof was measured. As a result, the flexural modulus was 45 GPa (along a fiber direction).

Example 2-8

A fiber-reinforced molded product was obtained in the same manner as in Example 2-1, except that the impregnated fiber fabrics after drying had 44 g, the core material resin foam was not impregnated with the resin, and the resin ratio (a value calculated by Equation (B1) of the resin ratio) in the whole of the fiber fabrics and the core material resin foam was 66%. The percentage of the thickness of the porous sheet forming the surface material to the thickness of the core material resin foam was 4%.

The fiber-reinforced molded product of Example 2-8 was measured with respect to a specific gravity and an entire thickness thereof and a thickness of the core material. The specific gravity was 1.30, the entire thickness was 0.9 mm, and the thickness of the core material was 0.43 mm. The compression rate of the core material resin foam was 2225%, as calculated according to Equation of the compression rate using the thickness (10 mm) of the core material resin foam before compression and the thickness (0.43 mm) of the core material. Also, to evaluate stiffness of the fiber-reinforced molded product of Example 2-8, a flexural modulus (JIS K 7074-1988 Method A) thereof was measured. As a result, the flexural modulus was 50 GPa (along a fiber direction).

Example 2-9

A fiber-reinforced molded product was obtained in the same manner as in Example 2-1, except that the fiber fabrics were not impregnated with the resin, the impregnated core material resin foam after drying had a weight of 40 g, and the resin ratio (a value calculated by Equation (B1) of the resin ratio) in the whole of the fiber fabrics and the core material resin foam was 54%. The percentage of the thickness of the porous sheet forming the surface material to the thickness of the core material resin foam was 4%.

The fiber-reinforced molded product of Example 2-9 was measured with respect to a specific gravity and an entire thickness thereof and a thickness of the core material. The specific gravity was 1.30, the entire thickness was 0.9 mm, and the thickness of the core material was 0.43 mm. The compression rate of the core material resin foam was 2225%, as calculated according to Equation of the compression rate using the thickness (10 mm) of the core material resin foam before compression and the thickness (0.43 mm) of the core material. Also, to evaluate stiffness of the fiber-reinforced molded product of Example 2-9, a flexural modulus (JIS K 7074-1988 Method A) thereof was measured. As a result, the flexural modulus was 46 GPa (along a fiber direction).

Example 2-10

A fiber-reinforced molded product was obtained in the same manner as in Example 2-2, except that an urethane resin foam (moltoprene MF80 produced by Inoac Corporation and having a density of 72 kg/m$^3$) having open cells was used as the core material resin foam, and the impregnation amount of the thermosetting resin into the core material resin foam was adjusted such that the resin ratio (a value calculated by Equation (B1) of the resin ration) in the whole of the fiber fabrics and the core material resin foam was 65%. The percentage of the thickness of the porous sheet forming the surface material to the thickness of the core material resin foam was 8%.

The fiber-reinforced molded product of Example 2-10 was measured with respect to a specific gravity and an entire thickness thereof and a thickness of the core material. The specific gravity was 1.35, the entire thickness was 0.9 mm, and the thickness of the core material was 0.44 mm. The compression rate of the core material resin foam was 1036%, as calculated according to Equation of the compression rate using the thickness (5 mm) of the core material resin foam before compression and the thickness (0.44 mm) of the core material. Also, to evaluate stiffness of the fiber-reinforced molded product of Example 2-10, a flexural modulus (JIS K 7074-1988 Method A) thereof was measured. As a result, the flexural modulus was 35 GPa (along a fiber direction).

Example 2-11

A fiber-reinforced molded product was obtained in the same manner as in Example 2-1, except that an epoxy resin (a mixture of EPICLON 850, a trade name, produced by DIC Corporation, and WH-108S, a trade name, produced by DIC Corporation, at a ratio of 100:30) was used as the thermosetting resin. The resin ratio (a value calculated by Equation (B1) of the resin ration) in the whole of the fiber fabrics and the core material resin foam was 65%. The percentage of the thickness of the porous sheet forming the surface material to the thickness of the core material resin foam was 4%.

The fiber-reinforced molded product of Example 2-11 was measured with respect to a specific gravity and an entire thickness thereof and a thickness of the core material. The specific gravity was 1.30, the entire thickness was 0.9 mm, and the thickness of the core material was 0.43 mm. The compression rate of the core material resin foam constituting the core material was 2225%, as calculated according to Equation of the compression rate using the thickness (10 mm) of the core material resin foam before compression and the thickness (0.43 mm) of the core material. Also, to evaluate stiffness of the fiber-reinforced molded product of Example 2-11, a flexural modulus (JIS K 7074-1988 Method A) thereof was measured. As a result, the flexural modulus was 49 GPa (along a fiber direction).

Example 2-12

A fiber-reinforced molded product was obtained in the same manner as in Example 2-1, except that a melamine resin foam (Basotect V3012, a trade name, produced by BASF and having a density of 9 kg/m$^3$) having open cells and cut to a thickness of 2.2 mm and a plane size of 200×300 mm (a weight of 1.2 g) was used as the core material resin foam. In addition, the impregnated core material resin foam after drying had a weight of 16 g. Also, the resin ratio (a value calculated by Equation (B1) of the resin ration) in the whole of the fiber fabrics and the core material resin foam was 65%. The percentage of the thickness of the porous sheet forming the surface material to the thickness of the core material resin foam was 18%.

The fiber-reinforced molded product of Example 2-12 was measured with respect to a specific gravity and an entire thickness thereof and a thickness of the core material. The specific gravity was 1.28, the entire thickness was 0.9 mm, and the thickness of the core material was 0.43 mm. The compression rate of the core material resin foam was 411%, as calculated according to Equation of the compression rate using the thickness (2.2 mm) of the core material resin foam before compression and the thickness (0.43 mm) of the core material. Also, to evaluate stiffness of the fiber-reinforced molded product of Example 2-12, a flexural modulus (JIS K 7074-1988 Method A) thereof was measured. As a result, the flexural modulus was 46 GPa (along a fiber direction).

Example 2-13

A fiber-reinforced molded product was obtained in the same manner as in Example 2-12, except that the thickness of the core material resin foam was 3 mm and the impregnation amount of the thermosetting resin into the core material resin foam was adjusted such that the resin ratio in the whole of the fiber fabrics and the core material resin foam was 65%. The percentage of the thickness of the porous sheet forming the surface material to the thickness of the core material resin foam was 13%.

The fiber-reinforced molded product of Example 2-13 was measured with respect to a specific gravity and an entire thickness thereof and a thickness of the core material. The specific gravity was 1.29, the entire thickness was 0.9 mm, and the thickness of the core material was 0.43 mm. The compression rate of the core material resin foam was 597%, as calculated according to Equation of the compression rate using the thickness (3 mm) of the core material resin foam before compression and the thickness (0.43 mm) of the core material. Also, to evaluate stiffness of the fiber-reinforced molded product of Example 2-13, a flexural modulus (JIS K 7074) thereof was measured. As a result, the flexural modulus was 47 GPa (along a fiber direction).

Example 2-14

A fiber-reinforced molded product was obtained in the same manner as in Example 2-12, except that the thickness of the core material resin foam was 4 mm and the impregnation amount of the thermosetting resin into the core material resin foam was adjusted such that the resin ratio in the whole of the fiber fabrics and the core material resin foam was 65%. The percentage of the thickness of the porous sheet forming the surface material to the thickness of the core material resin foam was 10%.

The fiber-reinforced molded product of Example 2-14 was measured with respect to a specific gravity and an entire thickness thereof and a thickness of the core material. The specific gravity was 1.29, the entire thickness was 0.9 mm, and the thickness of the core material was 0.43 mm. The compression rate of the core material resin foam was 830%, as calculated according to Equation of the compression rate using the thickness (4 mm) of the core material resin foam before compression and the thickness (0.43 mm) of the core material. Also, to evaluate stiffness of the fiber-reinforced molded product of Example 2-14, a flexural modulus (JIS K 7074) thereof was measured. As a result, the flexural modulus was 49 GPa (along a fiber direction).

Example 2-15

A phenolic resin (phenolite 5010, a trade name, produced by DIC Corporation and having solids of 60%) was mixed in ethanol at 50 wt %. A plain woven carbon fiber fabric (W-3101, a trade name, produced by TOHO TENAX Co. Ltd. and having a basis weight of 200 g/m$^2$) was immersed in the phenolic resin solution, and then a porous sheet (MF-50LE, a trade name, produced by Inoac Corporation and having a bulk specific gravity of 0.03 and a cell number of 50 cells/25 mm) was disposed thereon, thereby obtaining a prepreg.

As the porous sheet, an urethane resin foam, from which cell membranes were been removed by a dissolution treatment and which has been cut into a thickness of 0.7 mm in an uncompressed state, was used. In addition, a porosity of the urethane resin foam used was 97.1%. The porosity was calculated by the following equation.

Porosity (%)=(true specific gravity of urethane resin−bulk specific gravity(≈apparent density of urethane resin foam))/true specific gravity of urethane resin×100.

The carbon fiber fabric was used that had a size of 380×260 mm (a weight of 19.8 g per sheet). The impregnated carbon fiber fabrics after drying had a weight of 36 g per sheet.

Two sheets of prepregs obtained in this way were dried for 5 minutes under an atmosphere of 87° C.

A melamine resin foam (Basotect V3012, a trade name, produced by BASF and having a density of 9 kg/m$^3$) having open cells and cut to a thickness of 7.5 mm and a plane size of 380×260 mm (a weight of 6.0 g per sheet) as the core material resin foam was immersed in the phenolic resin solution in the same manner as in the case of the carbon fiber fabric. After taking out of the solution, the resin foam was dried for 31 minutes under an atmosphere of 100° C., thereby forming the impregnated core material resin foam. The impregnated core material member after drying had a weight of 67 g. Also, a resin ratio in the fiber fabric and the core material member was 64%.

Then, the prepreg, which is arranged to orient the porous sheet upward, the impregnated core material resin foam, and the prepreg, which is arranged to orient the porous sheet upward, were laminated in this order on a planar-type lower press forming mold made of SUS, of which a surface has been previously coated with a mold release agent, thereby obtaining a laminate. In other words, the laminate included the fiber fabric, the porous sheet, the core material resin foam, the fiber fabric and the porous sheet laminated in this order from bottom. This laminate was set on the lower press forming mold. The percentage of the thickness of the porous sheet forming the surface material to the total thickness of the core material member and the porous sheet forming the core material was 9%.

In the state that the laminate was set on the lower press forming mold, the laminate was pressed by the upper press forming mold (planar type) at 145° C. for 8 minutes with a surface pressure of 5 MPa, so that the laminate was compressed and heated and the phenolic resin was reacted and cured in the compressed state.

In this case, heating of the laminate was performed by cast-in heaters attached on the upper and lower press forming molds. In addition, a spacing of 1.0 mm was provided between the lower press forming mold and the upper press forming mold to adjust a compressed thickness of the laminate. Then, the lower and upper molds were opened, and as a result, a fiber-reinforced molded product, in which the fiber reinforcing materials were laminated on both surfaces of the core material and the surface material formed of the porous sheet was additionally integrally laminated on the fiber reinforcing material at one side, was obtained.

The fiber-reinforced molded product of Example 2-15 was measured with respect to a specific gravity and an entire thickness thereof and a thickness of the core material. The specific gravity was 1.40, the entire thickness was 1.0 mm, and the thickness of the core material was 0.48 mm. The compression rate of the core material resin foam was 1462%, as calculated according to Equation of the compression rate using the thickness (7.5 mm) of the core material resin foam before compression and the thickness (0.48 mm) of the core material. Also, to evaluate stiffness of the fiber-reinforced molded product of Example 2-15, a flexural modulus (JIS K 7074-1988 Method A) thereof was measured and as a result, the flexural modulus was 48 GPa.

Example 2-16

Prepregs obtained in the same manner as in Example 2-15 as described above were used. However, the prepreg, which is arranged to orient the porous sheet downward, the impregnated core material resin foam, and the prepreg, which is arranged to orient the porous sheet upward, were laminated in this order on a lower press forming mold made (planar-type) of SUS, of which a surface has been previously coated with a mold release agent, thereby obtaining a laminate. In other words, the laminate included the porous sheet, the fiber fabric, the core material resin foam, the fiber fabric and the porous sheet laminated in this order from bottom. This laminate was set on the lower press forming mold. The percentage of the total thickness of the porous sheets forming the surface material to the thickness of the core material member was 19%.

In the state that the laminate was set on the lower press forming mold, the laminate was pressed by the upper press forming mold (planar type) at 145° C. for 8 minutes with a surface pressure of 5 MPa, so that the laminate was compressed and heated and the phenolic resin was reacted and cured in the compressed state. In this case, heating of the laminate was performed by cast-in heaters attached on the upper and lower press forming molds. In addition, a spacing of 1.0 mm was provided between the lower press forming mold and the upper press forming mold to adjust a compressed thickness of the laminate. Then, the lower and upper molds were opened, and as a result, a fiber-reinforced molded product, in which the fiber reinforcing materials were laminated on both surfaces of the core material and the surface materials formed of the porous sheets were additionally integrally laminated on the fiber reinforcing materials, was obtained.

The fiber-reinforced molded product of Example 2-16 was measured with respect to a specific gravity and an entire thickness thereof and a thickness of the core material. The specific gravity was 1.40, the entire thickness was 1.0 mm, and the thickness of the core material was 0.48 mm. The compression rate of the core material resin foam was 1462%, as calculated according to Equation of the compression rate using the thickness (7.5 mm) of the core material resin foam before compression and the thickness (0.48 mm) of the core material. Also, to evaluate stiffness of the fiber-reinforced molded product of Example 2-16, a flexural modulus (JIS K 7074-1988 Method A) thereof was measured and as a result, the flexural modulus was 42 GPa.

Comparative Example 2-1

A fiber-reinforced molded product was obtained in the same manner as in Example 2-1, except that the thickness of the core material resin foam was 0.95 mm and the impregnation amount of the thermosetting resin into the core material resin foam was adjusted such that the resin ratio (a value calculated by Equation (B1) of the resin ratio) in the whole of the fiber fabrics and the core material resin foam was 65%. The percentage of the thickness of the porous sheet forming the surface material to the thickness of the core material resin foam was 42%.

The fiber-reinforced molded product of Comparative Example 2-1 was measured with respect to a specific gravity and an entire thickness thereof and a thickness of the core material. The specific gravity was 1.28, the entire thickness was 0.9 mm, and the thickness of the core material was 0.43 mm. The compression rate of the core material resin foam was 121%, as calculated according to Equation of the compression rate using the thickness (0.95 mm) of the core material resin foam before compression and the thickness (0.43 mm) of the core material. Also, to evaluate stiffness of the fiber-reinforced molded product of Comparative Example 2-1, a flexural modulus (JIS K 7074-1988 Method A) thereof was measured. As a result, the flexural modulus was 24 GPa (along a fiber direction). As compared to each of Examples described above, the compression rate was low, and thus the flexural modulus (stiffness) was low.

Comparative Example 2-2

A fiber-reinforced molded product was obtained in the same manner as in Example 2-1, except that the thickness of the core material resin foam was 30 mm and the impregnation amount of the thermosetting resin into the core material resin foam was adjusted such that the resin ratio (a value calculated by Equation (B1) of the resin ratio) in the whole of the fiber fabrics and the core material resin foam was 65%. However, the resin foam was not sufficiently compressed, so that only a molded product having large non-uniformity in thickness was obtained. Meanwhile, the percentage of the thickness of the porous sheet forming the surface material to the thickness of the core material resin foam was 1%.

Assuming that a resulted thickness of the core material had the same thickness (0.43 mm) as in Example 2-1, the compression rate in Comparative Example 2 was 6877%, as calculated according to Equation of the compression rate using the thickness (30 mm) of the core material resin foam.

Accordingly, because the compression rate exceeds 5000%, a good molded product was not obtained according to Comparative Example 2-2.

Comparative Example 2-3

A fiber-reinforced molded product was obtained in the same manner as in Example 2-8, except that, an urethane resin foam (THERMAX, a trade name, produced by Inoac Corporation and having a density of 30 kg/m³) having closed cells and cut to a size of 200×300×5 mm thickness (a weight of 9 g) was used as the core material resin foam, instead of the reins foam having open cells, and the resin ratio (a value calculated by Equation (B1) of the resin ration) in the whole of the fiber fabrics and the core material resin foam was 57%.

The fiber-reinforced molded product of Comparative Example 2-3 was measured with respect to a specific gravity and an entire thickness thereof and a thickness of the core material. The specific gravity was 1.29, the entire thickness was 0.9 mm, and the thickness of the core material was 0.44 mm. The compression rate of the core material resin foam constituting the core material was 1036%, as calculated according to Equation of the compression rate using the thickness (5 mm) of the core material resin foam before compression and the thickness (0.44 mm) of the core material.

Also, to evaluate stiffness of the fiber-reinforced molded product of Comparative Example 2-3, a flexural modulus (JIS K 7074-1988 Method A) thereof was measured. As a result, the flexural modulus was 22 GPa (along a fiber direction). As compared to each of Examples described above, because the foam having closed cells was used as the core material, the thermosetting resin was not uniformly dispersed and held in the core material, and the flexural modulus (stiffness) was low.

Comparative Example 2-4

A fiber-reinforced molded product was obtained in the same manner as in Example 2-1, except that the resin ratio (a value calculated by Equation (B1) of the resin ratio) in the whole of the fiber fabrics and the core material resin foam was 45%.

The fiber-reinforced molded product of Comparative Example 2-4 was measured with respect to a specific gravity and an entire thickness thereof and a thickness of the core material. The specific gravity was 1.28, the entire thickness was 0.9 mm, and the thickness of the core material was 0.43 mm. The compression rate of the core material resin foam was 2225%, as calculated according to Equation of the compression rate using the thickness (10 mm) of the core material resin foam before compression and the thickness (0.43 mm) of the core material.

Also, to evaluate stiffness of the fiber-reinforced molded product of Comparative Example 2-4, a flexural modulus (JIS K 7074-1988 Method A) thereof was measured. As a result, the flexural modulus was 27 GPa (along a fiber direction). As compared to each of Examples described above, because the resin ratio was excessively low, an amount of the thermosetting resin contained was small and the flexural modulus (stiffness) was low.

Comparative Example 2-5

A fiber-reinforced molded product was obtained in the same manner as in Example 2-1, except that the resin ratio in the whole of the fiber fabrics and the core material resin foam was 85%. However, because the resin ratio was too high, an amount of the thermosetting resin contained in the fiber fabrics and the resin foam was excessively large, so that sufficient compression was not performed. As a result, only a molded product having large non-uniformity in thickness was obtained.

Comparative Example 2-6

An urethane resin foam (THERMAX, a trade name, produced by Inoac Corporation and having a density of 30 kg/m³) having closed cells and cut to a size of 200×300×1.4 mm thickness (a weight of 2.5 g) was used as the core material resin foam, instead of the reins foam having open cells. Because the foam had closed cells and thus could not be impregnated with the thermosetting resin, the fiber fabrics were impregnated with the thermosetting resin.

The impregnated fiber fabrics after drying were adjusted to have a weight of 37 g per sheet, so that the resin ratio in the whole of the fiber fabrics and the core material resin foam was 65%. A fiber-reinforced molded product of Comparative Example 2-6 was obtained in the same manner as in Example 2-8 except for the foregoing.

The fiber-reinforced molded product of Comparative Example 2-6 was measured with respect to a specific gravity and an entire thickness thereof and a thickness of the core material. The specific gravity was 1.28, the entire thickness was 0.9 mm, and the thickness of the core material was 0.44 mm. The compression rate of the core material resin foam was 218%, as calculated according to Equation of the compression rate using the thickness (1.4 mm) of the core material resin foam before compression and the thickness (0.44 mm) of the core material. Also, to evaluate stiffness of the fiber-reinforced molded product of Comparative Example 2-6, a flexural modulus (JIS K 7074) thereof was measured. As a result, the flexural modulus was 18 GPa (along a fiber direction).

Comparative Example 2-7

A thermosetting resin foam (THERMAX, a trade name, produced by Inoac Corporation and having a density of 30 kg/m³) having closed cells and cut to a size of 200×300×2.3 mm thickness (a weight of 4.1 g) was used as the core material resin foam, the impregnated fiber fabrics after drying was adjusted to have a weight of 38 g per sheet, so that the resin ratio in the whole of the fiber fabrics and the core material resin foam was 65%. A fiber-reinforced molded product was obtained in the same manner as in Comparative Example 2-6 except for the foregoing.

The fiber-reinforced molded product of Comparative Example 2-7 was measured with respect to a specific gravity and an entire thickness thereof and a thickness of the core material. The specific gravity was 1.29, the entire thickness was 0.9 mm, and the thickness of the core material was 0.44 mm. The compression rate of the core material resin foam was 422%, as calculated according to Equation of the compression rate using the thickness (2.3 mm) of the core material resin foam before compression and the thickness (0.44 mm) of the core material. Also, to evaluate stiffness of the fiber-reinforced molded product of Comparative Example 2-7, a flexural modulus (JIS K 7074) thereof was measured. As a result, the flexural modulus was 20 GPa (along a fiber direction).

Comparative Example 2-8

A resin foam (THERMAX, a trade name, produced by Inoac Corporation and having a density of 30 kg/m³) having closed cells and cut to a size of 200×300×3 mm thickness (a weight of 5.4 g) was used as the core material resin foam, the impregnated fiber fabrics after drying was adjusted to have a weight of 39 g per sheet, so that the resin ratio in the whole of the fiber fabrics and the core material resin foam was 65%. A fiber-reinforced molded product was obtained in the same manner as in Comparative Example 2-6 except for the foregoing.

The fiber-reinforced molded product of Comparative Example 2-8 was measured with respect to a specific gravity and an entire thickness thereof and a thickness of the core material. The specific gravity was 1.29, the entire thickness was 0.9 mm, and the thickness of the core material was 0.44 mm. The compression rate of the core material resin foam was 581%, as calculated according to Equation of the compression rate using the thickness (3 mm) of the core material resin foam before compression and the thickness (0.44 mm) of the core material. Also, to evaluate stiffness of the fiber-reinforced molded product of Comparative Example 2-8, a flexural modulus (JIS K 7074) thereof was measured. As a result, the flexural modulus was 21 GPa (along a fiber direction).

Comparative Example 2-9

A thermosetting resin foam (THERMAX, a trade name, produced by Inoac Corporation and having a density of 30 kg/m$^3$) having closed cells and cut to a size of 200×300×4 mm thickness (a weight of 7.2 g) was used as the core material resin foam, the impregnated fiber fabrics after drying was adjusted to have a weight of 41 g per sheet, so that the resin ratio in the whole of the fiber fabrics and the core material resin foam was 65%. A fiber-reinforced molded product was obtained in the same manner as in Comparative Example 2-6 except for the foregoing.

The fiber-reinforced molded product of Comparative Example 2-9 was measured with respect to a specific gravity and an entire thickness thereof and a thickness of the core material. The specific gravity was 1.30, the entire thickness was 0.9 mm, and the thickness of the core material was 0.44 mm. The compression rate of the core material resin foam was 809%, as calculated according to Equation of the compression rate using the thickness (4 mm) of the core material resin foam before compression and the thickness (0.44 mm) of the core material. Also, to evaluate stiffness of the fiber-reinforced molded product of Comparative Example 2-9, a flexural modulus (JIS K 7074) thereof was measured. As a result, the flexural modulus was 21 GPa (along a fiber direction).

Comparative Example 2-10

A thermosetting resin foam (THERMAX, a trade name, produced by Inoac Corporation and having a density of 30 kg/m$^3$) having closed cells and cut to a size of 200×300×5 mm thickness (a weight of 9 g) was used as the core material resin foam, the impregnated fiber fabrics after drying was adjusted to have a weight of 43 g per sheet, so that the resin ratio in the whole of the fiber fabrics and the core material resin foam was 65%. A fiber-reinforced molded product was obtained in the same manner as in Comparative Example 2-6 except for the foregoing.

The fiber-reinforced molded product of Comparative Example 2-10 was measured with respect to a specific gravity and an entire thickness thereof and a thickness of the core material. The specific gravity was 1.30, the entire thickness was 0.9 mm, and the thickness of the core material was 0.44 mm. The compression rate of the core material resin foam was 1036%, as calculated according to Equation of the compression rate using the thickness (5 mm) of the core material resin foam before compression and the thickness (0.44 mm) of the core material. Also, to evaluate stiffness of the fiber-reinforced molded product of Comparative Example 2-10, a flexural modulus (JIS K 7074) thereof was measured. As a result, the flexural modulus was 22 GPa (along a fiber direction).

Compression rates, resin ratios, specific gravity, entire thicknesses, and flexural moduli with respect to each of Examples and Comparative Examples are shown in Table 2.

TABLE 2

| Items | Compression Rate (%) | Resin Ratio (%) | Specific Gravity (g/cm$^3$) | Thickness (mm) | Flexural Modulus (GPa) |
|---|---|---|---|---|---|
| Example 2-1 | 2225 | 65 | 1.30 | 0.9 | 50 |
| Example 2-2 | 1062 | 65 | 1.29 | 0.9 | 49 |
| Example 2-3 | 2513 | 65 | 1.32 | 0.9 | 51 |
| Example 2-4 | 225 | 65 | 1.28 | 0.9 | 46 |
| Example 2-5 | 4900 | 65 | 1.35 | 0.9 | 51 |
| Example 2-6 | 1823 | 74 | 1.45 | 1 | 55 |
| Example 2-7 | 2225 | 51 | 1.30 | 0.9 | 45 |
| Example 2-8 | 2225 | 66 | 1.30 | 0.9 | 50 |
| Example 2-9 | 2225 | 54 | 1.30 | 0.9 | 46 |
| Example 2-10 | 1036 | 65 | 1.35 | 0.9 | 35 |
| Example 2-11 | 2225 | 65 | 1.30 | 0.9 | 49 |
| Example 2-12 | 411 | 65 | 1.28 | 0.9 | 46 |
| Example 2-13 | 597 | 65 | 1.29 | 0.9 | 47 |
| Example 2-14 | 830 | 65 | 1.29 | 0.9 | 49 |
| Example 2-15 | 1462 | 64 | 1.40 | 1.0 | 48 |
| Example 2-16 | 1462 | 64 | 1.40 | 1.0 | 42 |
| Comparative Example 2-1 | 121 | 65 | 1.28 | 0.9 | 25 |
| Comparative Example 2-2 | 6877 | | | | |
| Comparative Example 2-3 | 1036 | 57 | 1.29 | 0.9 | 22 |
| Comparative Example 2-4 | 2225 | 45 | 1.28 | 0.9 | 27 |
| Comparative Example 2-5 | 85 | | | | |
| Comparative Example 2-6 | 218 | 65 | 1.28 | 0.9 | 18 |
| Comparative Example 2-7 | 422 | 65 | 1.29 | 0.9 | 20 |
| Comparative Example 2-8 | 581 | 65 | 1.29 | 0.9 | 21 |
| Comparative Example 2-9 | 809 | 65 | 1.30 | 0.9 | 21 |
| Comparative Example 2-10 | 1036 | 65 | 1.30 | 0.9 | 22 |

In Table 2, among Examples 2-1 to 2-5 and 2-12 to 2-14 in which the core material resin foams and the fiber fabrics are the same type and has the same resin ratio, Example 2-4 having a low compression rate of 225% has a lower flexural modulus (stiffness) than the other Examples, whereas Example 2-5 having a high compression rate of 4900% has a higher specific gravity than the other Examples. Thus, there is a tendency that when the compression rate is small, the flexural modulus (stiffness) becomes smaller accordingly, and on the other hand, there is a tendency that when the compression rate is large, the specific gravity becomes larger accordingly. From this point of view, the compression rate is 200 to 5000%, more preferably 1000 to 2600%.

Among Examples 2-1, 2-7 to 2-9 and Comparative Example 2-4 in which the core material resin foams and the fiber fabrics are the same type and has the same compression rate, Comparative Example 2-4 having a resin ratio of 45% has a low flexural modulus of 27 GPa, whereas Example 2-8 having a resin ratio of 66% has a higher flexural modulus of 50 GPa. Accordingly, it is found that when the resin ratio is high, the flexural modulus (stiffness) becomes larger.

In addition, Example 2-6 having substantially the same compression rate as those in Examples 2-1, 2-7 to 2-9 and Comparative Example 2-4 and having a high resin ratio of 74% has a specific gravity of 1.45, whereas Comparative Example 2-4 having a resin ratio of 45% has a specific gravity of 1.28 and Example 2-7 having a resin ratio of 51% has a specific gravity of 1.30. Accordingly, it is found that when the resin ratio is high, the specific gravity becomes larger. From this point of view, the resin ratio is 50 to 80%, more preferably 55 to 50%.

Comparative Examples 2-3 and 2-6 to 2-10 in which the core material resin foams have closed cells has an extremely low flexural modulus, as compared to Examples and the other Comparative Examples in which the core material resin foams have open cells. Also, Examples 2-1 to 2-16 in which the percentage of the total thickness of the porous sheets forming the surface material before compression to the total thickness of the core material member and the porous sheet forming the core material before compression was 2 to 29%, had a flexural modulus larger than that of Comparative Example 2-4 in which the percentage was 40%.

In addition, when comparing Example 2-15, in which the porous sheet is covered on only one surface of the fiber-reinforced molded product, to Example 2-16, in which the porous sheet are covered on both surfaces of the fiber-reinforced molded product, it is found that Example 2-16 has a high flexural modulus although the flexural modulus is lower than that of Example 2-15. In other words, the flexural modulus (stiffness) can be sufficiently kept, even when the porous sheets having open cells are disposed on both surfaces to enhance design ability. Thus, according to the fiber-reinforced molded product of the present invention, the stiffness can be compatible with the aesthetic appearance.

As described above, the article according to examples of the present invention has a light weight, a thinned thickness and a high stiffness, and also has a good appearance after coating, thereby eliminating a possibility that the coating film may be peeled off. Therefore, the article is suitable for a housing of portable devices, such as laptop computers.

According to the present invention, the porous sheet used in the laminating step may be previously impregnated with the thermosetting resin. In this case, even if the compression rate in the subsequent compressing and heating step is low, the thermosetting resin can be disposed on the surface of the porous sheet to easily form a uniform resin layer, thereby obtaining a fiber-reinforced molded product having a good surface smoothness.

Although the present invention has been described with referenced to the detailed and specific embodiments, it should be apparent to those skilled in the art that numerous changes and modifications can be made without departing the scope and spirit of the present invention.

This application is based on Japanese Patent Application No. 2010-191850 filed on Aug. 30, 2010 and Japanese Patent Application No. 2010-247288 filed on Nov. 4, 2010, the entire contents of which are incorporated herein by reference.

Industrial Applicability

The fiber-reinforced molded product according to the present invention has a smooth surface, because stepped portions created in textures and the like of the fiber fabric constituting the fiber reinforcing material can be filled with the thermosetting resin impregnated into the porous sheet and cured. As a result, the fiber-reinforced molded product according to the present invention has a high stiffness because of the fiber reinforcing material and also has a good appearance and a good adhesion to coating materials because of the smooth surface. Also, according to the method for manufacturing a fiber-reinforced molded product of the present invention, a fiber-reinforced molded product having a high stiffness and a good appearance can be easily obtained.

LIST OF REFERENCE NUMERALS

10 Fiber-Reinforced Molded Product
10A, 10B, 10C, 10D, 10E Laminate
11 Core Material
11A Core Material Member
11B Thermosetting Resin
11C Impregnated Core Material Member
21 Fiber Reinforcing material
21A Fiber Fabric
21B Thermosetting Resin
21C Impregnated Fiber Fabric
25 Surface Material
25A Porous Sheet
27 Coating film
20A Prepreg
31 Lower Mold
33 Upper Mold

The invention claimed is:

1. A fiber-reinforced molded product, comprising:
a core material;
a fiber reinforcing material laminated on at least one surface of the core material; and
a surface material laminated on the fiber reinforcing material,
the core material is formed by curing a thermosetting resin which is impregnated into a core material member in a compressed state, the core material member being a resin foam having open cells,
the fiber reinforcing material comprises a fiber fabric and a thermosetting resin impregnated into the fiber fabric and cured, wherein the core material, the fiber reinforcing material and the surface material are integrated by the thermosetting resin,
the surface material comprises an urethane resin foam sheet, from which cell membranes are removed, and the urethane resin foam sheet is laminated on the fiber fabric and the resin foam and heated in a compressed state such that the thermosetting resin which is impregnated in at least one of the core material member and the fiber fabric before curing is impregnated into the urethane resin foam sheet and cured, so that the thermosetting resin extruded on a surface of the urethane resin foam sheet, from which cell membranes are removed, is cured on the surface material has a surface roughness Rz of 30 μm or less, and
a thickness ratio of the urethane resin foam sheet to the core material is from 4% to 30% before compression.

2. The fiber-reinforced molded product according to claim 1, wherein the fiber reinforcing material is laminated on both surfaces of the core material, and the surface material is laminated on at least one surface of the fiber reinforcing material.

3. The fiber-reinforced molded product according to claim 1, wherein the core material comprises a plurality of core material members.

4. The fiber-reinforced molded product according to claim 1, wherein a surface of the surface material has a surface roughness of 25 μm or less.

5. The fiber-reinforced molded product according to claim 1, wherein the fiber fabric includes carbon fibers.

6. The fiber-reinforced molded product according to claim 1, wherein the urethane resin foam sheet has 8 to 80 cells/25 mm open cells and cell membranes are removed therefrom.

* * * * *